US012539333B2

(12) United States Patent
Kiesow et al.

(10) Patent No.: US 12,539,333 B2
(45) Date of Patent: Feb. 3, 2026

(54) TETRACYCLINE COMPLEXES WITH SUSTAINED ACTIVITY

(71) Applicant: FRAUNHOFER-GESELLSCHAFT ZUR FÖRDERUNG DER ANGEWANDTEN FORSCHUNG E.V., Munich (DE)

(72) Inventors: Andreas Kiesow, Halle (DE); Mirko Buchholz, Halle (DE); Sandra Sarembe, Halle (DE); Karsten Mäder, Leipzig (DE); Martin Kirchberg, Halle (DE); Sigrun Eick, Bolligen (CH)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 1015 days.

(21) Appl. No.: 17/289,661

(22) PCT Filed: Oct. 29, 2019

(86) PCT No.: PCT/EP2019/079566
§ 371 (c)(1),
(2) Date: Apr. 28, 2021

(87) PCT Pub. No.: WO2020/089249
PCT Pub. Date: May 7, 2020

(65) Prior Publication Data
US 2021/0401996 A1    Dec. 30, 2021

(30) Foreign Application Priority Data
Oct. 29, 2018    (EP) ..................................... 18203133
Aug. 23, 2019    (EP) ..................................... 19193328

(51) Int. Cl.
*A61K 47/59*      (2017.01)
*A61K 31/65*      (2006.01)
*A61K 47/69*      (2017.01)

(52) U.S. Cl.
CPC ............ *A61K 47/593* (2017.08); *A61K 31/65* (2013.01); *A61K 47/69* (2017.08)

(58) Field of Classification Search
CPC ....... A61K 47/593; A61K 31/65; A61K 47/69
See application file for complete search history.

(56) References Cited
U.S. PATENT DOCUMENTS

| | | |
|---|---|---|
| 4,568,536 A | 2/1986 | Kronenthal et al. |
| 4,685,883 A | 8/1987 | Jernberg |
| 4,938,763 A | 7/1990 | Dunn et al. |
| 5,000,886 A | 3/1991 | Lawter et al. |
| 5,059,123 A | 10/1991 | Jernberg |
| 5,228,101 A | 7/1993 | Lebby et al. |
| 5,236,355 A | 8/1993 | Brizzolara et al. |
| 5,290,271 A | 3/1994 | Jernberg |
| 5,324,520 A | 6/1994 | Dunn et al. |
| 5,447,725 A | 9/1995 | Damani et al. |
| 5,612,052 A | 3/1997 | Shalaby |
| 5,620,700 A | 4/1997 | Berggren et al. |
| 5,736,152 A | 4/1998 | Dunn |
| 5,744,153 A | 4/1998 | Yewey et al. |
| 5,981,499 A | 11/1999 | Hau |
| 6,123,957 A | 9/2000 | Jernberg |
| 7,128,927 B1 | 10/2006 | Dunn |
| 2001/0024636 A1 | 9/2001 | Weller et al. |
| 2002/0035096 A1 | 3/2002 | Lawter et al. |
| 2003/0082234 A1 | 5/2003 | Seo et al. |
| 2003/0165792 A1 | 9/2003 | Jodaikin et al. |
| 2003/0186191 A1 | 10/2003 | Lawter et al. |
| 2003/0199480 A1 | 10/2003 | Hayes et al. |
| 2004/0010224 A1 | 1/2004 | Bodmeier |
| 2004/0029843 A1 | 2/2004 | Lawter |
| 2004/0167099 A1 | 8/2004 | Lawter |
| 2004/0202693 A1 | 10/2004 | Chang |
| 2004/0208906 A1 | 10/2004 | Tatara et al. |

(Continued)

FOREIGN PATENT DOCUMENTS

| | | |
|---|---|---|
| CN | 101288673 A | 10/2008 |
| CN | 101822650 A | 9/2010 |

(Continued)

OTHER PUBLICATIONS

Olsvik, B., et al. Clin Infect Dis. Jun. 1993: 16 Suppl 4:S310-3. (Year: 1993).*
Chopra, I., et al. Microbiol. Mol. Biol. Rev. Jun. 2001; 65(2): 232-260. (Year: 2001).*
Patil, H., et al. International Journal of Pharmaceutics. 471, (2014), 153-156. (Year: 2014).*
Patil, H., et al., AAPS PharmSciTech, vol. 17, No. 1, 2016. (Year: 2015).*
Holmkvist A. D., et al., International Journal of Pharmaceutics. 499, (2016), 351-357. (Year: 2016).*
Healy, A. M., et al. Advanced Drug Delivery Reviews 117 (2017) 25-46. (Year: 2017).*
Oliveira M. S., et al., Expert Opinion On Drug Delivery, 2017, vol. 14, No. 8, 983-995 (Year: 2017).*
Wu, L., et al. J. Pharmaceutical Sciences. 107, 2018, 3134-3142. (Year: 2018).*

(Continued)

*Primary Examiner* — Eric Olson
*Assistant Examiner* — Samuel L Galster
(74) *Attorney, Agent, or Firm* — Seed IP Law Group LLP

(57) ABSTRACT

The present invention generally relates to controlled release of tetracycline antibiotics. Specifically, it relates to a complex comprising a tetracycline compound (TC) or a pharmaceutically acceptable salt, hydrate or solvate thereof and a divalent metal carboxylate; a pharmaceutical preparation comprising the complex, methods for manufacturing the complex and the pharmaceutical preparation, and a complex or a pharmaceutical preparation for use in a method for treatment of the human or animal body, in particular for therapy and/or prophylaxis of a bacterial infection; and/or wherein antibiotic activity is maintained over a prolonged period of time; and/or for the therapy and/or prophylaxis of an acute, chronic or recurrent periodontal disease.

22 Claims, 12 Drawing Sheets

(56) References Cited

U.S. PATENT DOCUMENTS

| | | |
|---|---|---|
| 2004/0228912 A1 | 11/2004 | Chang et al. |
| 2005/0019396 A1 | 1/2005 | deVries et al. |
| 2005/0079202 A1 | 4/2005 | Chen et al. |
| 2005/0249773 A1 | 11/2005 | Maspero et al. |
| 2005/0282786 A1 | 12/2005 | Brown et al. |
| 2006/0003008 A1 | 1/2006 | Gibson et al. |
| 2006/0009839 A1 | 1/2006 | Tan |
| 2006/0183719 A1 | 8/2006 | deVries et al. |
| 2006/0252049 A1 | 11/2006 | Shuler et al. |
| 2007/0059310 A1 | 3/2007 | Karel |
| 2008/0081074 A1 | 4/2008 | Gu et al. |
| 2008/0102127 A1 | 5/2008 | Gao et al. |
| 2008/0124400 A1 | 5/2008 | Liggins et al. |
| 2008/0233206 A1 | 9/2008 | Chomczynski |
| 2009/0004281 A1 | 1/2009 | Nghiem et al. |
| 2009/0048145 A1 | 2/2009 | Hellerbrand et al. |
| 2009/0062909 A1 | 3/2009 | Taylor et al. |
| 2009/0110728 A1 | 4/2009 | Rastogi et al. |
| 2009/0142727 A1 | 6/2009 | Lawter et al. |
| 2009/0155326 A1 | 6/2009 | Mack et al. |
| 2009/0182425 A1 | 7/2009 | Duda et al. |
| 2010/0136502 A1 | 6/2010 | Wu et al. |
| 2010/0158969 A1 | 6/2010 | Tice |
| 2010/0198278 A1 | 8/2010 | Cobian et al. |
| 2010/0247668 A1 | 9/2010 | Eliasof et al. |
| 2010/0286417 A1 | 11/2010 | Mendes et al. |
| 2010/0317629 A1 | 12/2010 | Gallagher et al. |
| 2011/0171144 A1 | 7/2011 | Wang et al. |
| 2012/0100199 A1 | 4/2012 | Avramoff et al. |
| 2012/0185004 A1 | 7/2012 | McJames et al. |
| 2012/0244491 A1 | 9/2012 | Piergallini et al. |
| 2013/0004651 A1 | 1/2013 | Fu-Giles |
| 2013/0040918 A1 | 2/2013 | Griffith et al. |
| 2013/0195986 A1 | 8/2013 | Heggie et al. |
| 2014/0147504 A1 | 5/2014 | Salman et al. |
| 2014/0187487 A1 | 7/2014 | Shoichet et al. |
| 2014/0199385 A1 | 7/2014 | Steendam et al. |
| 2015/0112251 A1 | 4/2015 | MacLaughlan et al. |
| 2015/0125391 A1 | 5/2015 | Swami et al. |
| 2015/0290280 A1 | 10/2015 | Petrak et al. |
| 2016/0038645 A1 | 2/2016 | Pereira Matrins et al. |
| 2016/0151134 A1 | 6/2016 | Britt et al. |
| 2016/0175482 A1 | 6/2016 | Quirk et al. |
| 2016/0296537 A1* | 10/2016 | Lowalekar ............ A61K 9/2072 |
| 2017/0095596 A1 | 4/2017 | Petrak et al. |
| 2017/0105724 A1 | 4/2017 | Limem et al. |
| 2017/0189660 A1 | 7/2017 | Baek |
| 2017/0319193 A1 | 11/2017 | Pulapura et al. |
| 2018/0029977 A1 | 2/2018 | Mendes et al. |
| 2018/0065310 A1 | 3/2018 | Hodgdon et al. |
| 2019/0117561 A1 | 4/2019 | Jeong et al. |
| 2019/0330419 A1 | 10/2019 | Song et al. |
| 2020/0009293 A1 | 1/2020 | Teu et al. |
| 2020/0061239 A1 | 2/2020 | Petrak et al. |
| 2020/0268680 A1 | 8/2020 | Blaesi et al. |
| 2020/0375935 A1 | 12/2020 | Jernberg |
| 2020/0390889 A1 | 12/2020 | Horner et al. |
| 2021/0030874 A1 | 2/2021 | Pätiläet al. |
| 2021/0154300 A1 | 5/2021 | Ferrari et al. |
| 2021/0228848 A1 | 7/2021 | Gill et al. |
| 2021/0299149 A1 | 9/2021 | Vozone et al. |

FOREIGN PATENT DOCUMENTS

| | | |
|---|---|---|
| CN | 101940560 A | 1/2011 |
| CN | 103356910 A | 10/2013 |
| CN | 105534941 A | 5/2016 |
| CN | 108324700 A | 7/2018 |
| CN | 111773179 A | 10/2020 |
| CN | 112807272 A | 5/2021 |
| EA | 016206 B1 | 3/2012 |
| GB | 2414668 A | 12/2005 |
| IN | IN2012MUM2005 B | 8/2007 |
| JP | S61225137 A | 10/1986 |
| JP | S62123120 A | 6/1987 |
| JP | 11292767 A2 | 10/1999 |
| JP | 2004514702 A | 5/2004 |
| JP | 2006522162 A | 9/2006 |
| JP | 2006523703 A | 10/2006 |
| JP | 2008528501 A | 7/2008 |
| KR | 101534522 B1 | 7/2015 |
| PT | 110699 A | 8/2018 |
| RU | 2211022 C2 | 8/2003 |
| WO | WO 8606586 A1 | 11/1986 |
| WO | WO 9200718 A1 | 1/1992 |
| WO | WO 9744016 A1 | 11/1997 |
| WO | 99/42083 A1 | 8/1999 |
| WO | WO 0192288 A2 | 12/2001 |
| WO | WO 0243785 A2 | 6/2002 |
| WO | WO 03070218 A1 | 8/2003 |
| WO | WO 2004000276 A1 | 12/2003 |
| WO | WO 2007050181 A2 | 5/2007 |
| WO | WO 2008121107 A1 | 10/2008 |
| WO | WO 2010046932 A2 | 4/2010 |
| WO | 2012/128417 A1 | 9/2012 |
| WO | WO 2015069305 A1 | 5/2015 |
| WO | WO 2021087179 A1 | 5/2021 |

OTHER PUBLICATIONS

Zupancic, O., et al. Drug Deliv. 2016; 23(6): 2074-2083. (Year: 2016).*

"Adjuvante Antibiotika in der Parodontitistherapie—Adjuvant antibiotics in periodontal therapy," Wissenschaftliche Stellungnahme: Deutsche Gesellschaft für Zahn- Mund- und Kieferheilkunde, 2003 (10 pages).

"Arestin®," FDA Label, Rev. May 2017 (10 pages).

"Ligosan® slow release zur Behandlung von Zahnfleischtaschen—Ligosan slow release for the treatment of Gingival pockets," URL= https://www.parodontitis.com/ligosan-slow-releaseR-zur-behandlung-von zahnfleischtaschen.html?bview=print, download date Dec. 9, 2018 (4 pages).

"Niedrig dosiertes DoxycyclineLow-dose doxy), Periostat".URL= https://www.parodontitis.com/niedrig-dosiertes-tetrazyklin-low-dose-doxy.html?bview-print, download date Dec. 9, 2018 (4 pages).

"Vom Markt genommen: Atridox®, Actisite®, Arestin® und Elyzol®," URL=https://www.parodontitis.com/vom-markt-genommen-atridoxR-actisiteR-arestinR-und-elyzolR.html?bview=print, download date Dec, 9, 2018 (2 pages).

Lunestad et al., "Reduction in the antibacterial effect of oxytetracycline in sea water by complex formation with magnesium and calcium," *Diseases of Aquatic Organisms* 9:67-72, 1990.

Naz et al., "In vitro Studies of the Loss of Antibacterial Activity of Oxytetracycline in Presence of Ca(II) or Mg(II) Ions," *Arzneim-Forsch/Drug Res.* 46(II):701-704, 1996.

Remon et al., "Interpretation of thermograms of oxytetracycline-excipient mixtures," *Journal of Pharmacy and Pharmacology* 30:204, 1978.

Nagatake, T., "Antimicrobial chemotherapy in the era of multidrug-resistant bacteria—Current status and future prospects—II. positioning and appropriate use of various antimicrobial agents in the era of multidrug-resistant bacteria 7. tetracyclines," *Journal of the Japanese Society of Internal Medicine* 92(11):2141-2148, 2003 (with English Translation).

Cha et al., "Design of pH-Independent Extended Release Matrix Tablets of Minocycline Hydrochloride for the Treatment of Dementia," *Arch Pharm Res* 32(11):1593-1598, 2009. (6 pages).

Irish Medicines Board, "Summary of Product Characteristics; Dentomycin 2% w/w Periodontal Gel," CRN 2097246, Mar. 23, 2011. (5 pages).

Kashi et al., "Improved drug loading and antibacterial activity of minocycline-loaded PLGA nanoparticles prepared by solid/oil/water ion pairing method," *International Journal of Nanomedicine* 7:221-234, 2012. (14 pages).

Keny et al., "Formulation and Evaluation of Once Daily Minocycline Hydrochloride Extended Release Matrix Tablets," *Indian J. Pharm. Sci.* 71(3):295-302, May-Jun. 2009. (8 pages).

Par Pharmaceutical Companies Inc., "Dynacin® [Minocycline HCL Tablets, USP]," revised Nov. 2011. (2 pages).

(56) References Cited

OTHER PUBLICATIONS

Pfizer Labs, "69-1680-32-Vibramycin®," Apr. 2007. (17 pages).
Yao et al., "Local delivery of minocycline-loaded PEG-PLA nanoparticles for the enhanced treatment of periodontitis in dogs," *International Journal of Nanomedicine* 9:3963-3970, 2014. (8 pages).
Honnorat-Benabbou et al., "Stability study of tetracyclines with respect to their use in slow release systems," *Journal of Materials Science: Materials in Medicine* 12:107-110, Feb. 2001. (4 pages).
Ligosan® Slow Release, "Periodontitis therapy today.," *Kulzer GmbH*, Registration No. 53876.00.00, Jul. 2017. (with English machine translation) (24 pages).
Litch et al., "Use of the polymeric matrix as internal standard for quantitation of in vivo delivery of tetracycline HCl from Actisite® tetracycline fiber during periodontal treatment," *Journal of Periodontal Research* 31:540-544, Jan. 20, 1996. (6 pages).
Merck, "PLA & PLGA Biodegradable Polymers," Dec. 2019, URL=https://www.sigmaaldrich.com/safc/actives-formulations/pla-plga.html, retrieved on Sep. 27, 2024. (2 pages).
Millipore Sigma, "RESOMER Biodegradable Polymers for Medical Device Applications Research," Aug. 2021, URL= https://www.sigmaaldrich.com/US/en/technical-documents/technical-article/materials-science-and-engineering/drug-delivery/resomer?srsltid=AfmBOopMS6ROKJALe-ykvA7wSqRGHawT-j2Sn6Ggan1tesUAVFG8gStJ, retrieved on Oct. 10, 2024. (8 pages).
Rajeshwari et al., "Local drug delivery systems in the management of periodontitis: A scientific review," *Journal of Controlled Release* 307:393-409, Aug. 10, 2019. (17 pages).
Ratka-Krüger et al., "Non-Surgical Periodontal Therapy With Adjunctive Topical Doxycycline: A Double-Masked, Randomized, Controlled Multicenter Study. II. Microbiological Results," *J Periodontol* 76(1):66-74, Jan. 2005. (9 pages).
Research, Science and Therapy Committee of the American Academy of Periodontology, "The Role of Controlled Drug Delivery for Periodontitis*," *J Periodontol* 71:125-140, Jan. 2000. (16 pages).
Sadat et al., "Improved drug loading and antibacterial activity of minocycline-loaded PLGA nanoparticles prepared by solid/oil/water ion pairing method," *International Journal of Nanomedicine* 7:221-234, Jan. 9, 2012. (14 pages).
Wang et al., "Minocycline-loaded In situ Hydrogel for Periodontitis Treatment," *Current Drug Delivery* 15(5):664-671, Jun. 1, 2018. (8 pages).
Zhang et al., "Metal ion-assisted self-assembly of complexes for controlled and sustained release of minocycline for biomedical applications," *Biofabrication.* 7(1): 015006 (HHS Public Access Author Manuscript, available in PMC Jan. 20, 2016) (25 pages).
Berthon et al., "Metal Ion-Tetracycline Interactions in Biological Fluids. 2. Potentiometric Study of Magnesium Complexes with Tetracycline, Oxytetracycline, Doxycycline, and Minocycline, and Discussion of their Possible Influence on the Bioavailability of these Antibiotics in Blood Plasma," Journal of Inorganic Biochemistry 19:1-18, 1983. (18 pages).
Berthon et al., "Speciation studies in relation to the bioavailability and drug activity of tetracyclines," Handbook on Metal-Ligand Interactions in Biological Fluids 1:1252-1265, Jan. 1995. (16 pages).
Lambs et al., "Metal Ion-Tetracycline Interactions in Biological Fluids. Part 3. Formation of Mixed-Metal Ternary Complexes of Tetracycline, Oxytetracycline, Doxycycline, and Minocycline, with calcium and magnesium, and Their Involvement in the Bioavailability of these Antibiotics in Blood Plasma," Agents and Actions 14 (5/6):743-750, 1984. (8 pages).

\* cited by examiner

TETRACYCLINE COMPLEXES WITH SUSTAINED ACTIVITY

FIELD OF THE INVENTION

The present invention generally relates to controlled release of tetracycline antibiotics. Specifically, it relates to a complex comprising a tetracycline compound (TC) or a pharmaceutically acceptable salt, hydrate or solvate thereof and a divalent metal carboxylate; a pharmaceutical preparation comprising the complex, methods for manufacturing the complex and the pharmaceutical preparation, and a complex or a pharmaceutical preparation for use in a method for treatment of the human or animal body, in particular for therapy and/or prophylaxis of a bacterial infection; and/or wherein antibiotic activity is maintained over a prolonged period of time; and/or for the therapy and/or prophylaxis of an acute, chronic or recurrent periodontal disease.

BACKGROUND ART

The tetracycline compounds are a class of antibiotics that inhibit protein synthesis by preventing the attachment of aminoacyl-tRNA to the ribosomal acceptor (A) site. The tetracyclines are broad-spectrum agents, exhibiting activity against a wide range of gram-positive and gram-negative bacteria, atypical organisms such as chlamydiae, mycoplasmas, and rickettsiae, and protozoan parasites. The favorable antimicrobial properties of these agents and the absence of major adverse side effects has led to their extensive use in the therapy of human and animal infections, for instance periodontal disease (Chopra et al., *Microbiol Mol Biol Rev.* 2001, June 65(2):232-60). Tetracycline molecules comprise a linear fused tetracyclic nucleus (rings designated A, B, C, and D) to which a variety of functional groups are attached. The simplest tetracycline to display detectable antibacterial activity is 6-deoxy-6-demethyltetracycline and so this structure may be regarded as the minimum pharmacophore (Mitscher, L. A. 1978. *The chemistry of the tetracycline antibiotics*. Marcel Dekker, Inc., New York, N.Y):

Tetracycline antibiotics that are widely clinically used include doxycycline, minocycline and tetracycline. An overview of the most commonly used tetracycline antibiotics is shown below:

chlortetracycline: X = Cl, $R^1$ = OH, $R^2$ = Me, $R^3$ = H
doxycycline: X = H, $R^1$ = H, $R^2$ = Me, $R^3$ = OH
minocycline: X = $N(CH_3)_2$, $R^1$ = $R^2$ = $R^3$ = H
oxytetracycline: X = H, $R^1$ = OH, $R^2$ = Me, $R^3$ = OH
tetracycline: X = H, $R^1$ = OH, $R^2$ = Me, $R^3$ = H Among these, especially doxycycline and minocycline have been used in the treatment of periodontal diseases. However, there are problems with the therapeutic applications of these active substances due to their relatively short retention time and their instability in aqueous environment.

Periodontal diseases are highly prevalent. About 30% of the human population is affected worldwide. They have considerable impact on individuals and society, and are costly to treat. The cost of dental care is the fourth highest of all diseases and consuming between 5 and 10% of all healthcare resources (Batchelor, P. *British Dental Journal* 2014, 217, 405-409). Representative population studies show that periodontal diseases are widespread and their prevalence has been increasing since 1997 (Micheelis, W. et al. *Vierte Deutsche Mundgesundheitsstudie (DMS IV)*, Deutscher Ärzte-Verlag, Köln, 2006). Amongst the adult population in Germany, 52.7% were found to be affected by moderately severe and 20.5% by severe forms of periodontitis. The health insurance expenditure in Germany for the direct treatment of periodontitis amounted to about EUR 1.1 billion (Statistisches Bundesamt, 2008), not including the costs incurred by secondary diseases.

Periodontitis is a general term describing inflammation condition of the periodontal apparatus which is caused by multi-bacterial induction and has strong relations to various systemic diseases, such as cardiovascular diseases, rheumatoid arthritis, chronic obstructive pulmonary disease and Alzheimer's disease.

The currently established therapy of periodontitis, according to the recommendations of the German Society of Dental, Oral and Craniomandibular Sciences, is generally performed by manual supra and subgingival debridement (removal of the bacterial plaques) along with the application of antiseptic substances (daily disinfection by mouth washes), which disintegrates the entire oral biofilm and provides an opportunity for recolonization by potential pathogens (Sanz, I. et al. *J Evid Based Dent Practice* 2012, 12(3), 76-86). Furthermore, adjuvant systemic broad-spectrum antibiotic therapy is applied in advanced disease forms, such as persistent or recurrent localized deep sites (Jepsen, K. et al. *Periodontol* 2000 2016, 71(1), 812-112). The latter also leads to a non-selective destruction of the biofilm and has to be administered in high doses and over a prolonged period of time in order to reach sufficient therapeutic levels at the particular site of action, i.e. the gingival pocket. Standard adjuvant therapy of periodontitis involves, for instance, systemic administration of doxyciclin (per os) 1×200 mg/die for 1 day and 2×100 mg/die for further 18 days (Wissenschaftliche Stellungnahme: Adjuvante Antibiotika in der Parodontitistherapie, Deutsche Gesellschaft für Zahn-Mund- und Kieferheilkunde, *DZZ* 2003). As a result, resistance development in oral pathogens is observed. Further, the microbiome in the patient's intestine is destroyed, which leads to a loss of metabolic support, immune modulation, and enables recolonization by potential pathogens. A focused and targeted therapy would represent a significant improvement in the treatment of periodontitis and conditions associated therewith. A systematic review showed a significant effect of tetracycline formulations on reduction of periodontal probing depth (Matesanz-Perez, P. et al. *J Clin Periodontol* 2013, 40(3), 227-241).

The presence of periodontopathogenic bacteria varies among periodontitis patients. Nevertheless, the occurrence of certain bacterial species in the subgingival plaques has been found to be closely associated with the etiology of periodontal diseases (Socransky et al., *Journal of Clinical Periodontology*, 1998, 25, 134-144). The first step towards the development of periodontitis is the colonization of bacteria "yellow complex," "green complex" and "purple complex" in healthy periodontal sites. The *Actinomyces* species is closely related to members of the "yellow complex" (*Streptococcus sanguis, Streptococcus mitis, Streptococcus gordonii* and *Streptococcus intermedius*), "green complex" (*Eikenella corrodens, Capnocytophaga gingivalis, Capnocytophaga sputigena*), and "purple complex" (*Veillonella parvula, Actinomyces odontolyticus*). These complexes are followed by colonization by the members of the bacteria of the so-called "orange complex" including members of the *Fusobacterium nucleatum/periodonticum* subspecies, *Prevotella intermedia, Prevotella nigrescens* and *Parvimonas micra* (formerly known as *Peptostreptococcus micros* or *Micromonas micros*). Colonization of healthy periodontal sites by members of the "orange complex" has been found to correlate with the occurrence of gingivitis. The bacteria of the "orange complex" furthermore promote the colonization by bacteria of the so-called "red complex", which in turn are associated with deep pockets and chronic periodontitis. The "red complex" consisting of the tightly related group *Tannerella forsythia, Porphyromonas gingivalis* and *Treponema denticola* strongly relates to clinical measures of periodontal disease and in particular to pocket depth and bleeding on probing. Additionally, Lamont et al. (Microbiology 2002, 148, 1627-1636.) and Daep et al. (*Infect. Immun.* 2006, 74, 5756-5762) demonstrated that *S. gordonii* plays a role in colonization with *Porphyromonas gingivalis*.

The application of antibiotics or antiseptics within an adhesive slow-release form of administration for topical application is technologically challenging. The oral mucosa is covered by a liquid film and is partially colonized by bacteria. Additionally, it is subject to mechanical stress due to speaking, swallowing and chewing. Although these stress sources are not present in the periodontal pocket per se, the presence of sulcus liquid (the flow rate of which is strongly increased in the case of periodontitis) leads to increased washing out of active substances out of the pocket.

In view of this difficult starting situation, none of the existing products or local antibiotic or antiseptic therapy has been able to solve the existing problems in a satisfactory manner. For instance, Actisite® is a tetracycline containing fiber for periodontal pocket placement requiring a complicated application by a specialized dentist into the periodontal pocket and a further intervention for removal after 10 days. This product is not on the German market anymore. Elyzol®, a metronidazol containing gel, fails to meet their expectations for active ingredient release beyond two days due to lack of sufficient gel adhesion. This product is also not on the German market anymore. Atridox®, a doxycycline containing controlled-release product composed of a two syringe mixing system, has also been taken off the German market.

Ligosan®, which is a doxycycline containing application system, and Periochip®, which is a chlorhexidine containing bio degradable chip, are the only products for local application still available on the market. Ligosan® is an application system comprising 14% of doxycycline in a biodegradable gel matrix for application in the periodontal pocket by means of a special location system, which provides a continuous release over 12 days and leads to an improvement of the periodontal pockets. However, the handling and manageability of the gel is complicated and application of the proper amount in all parts of the pocket is difficult, especially when not directly visible interdental spaces in the area of the side teeth are concerned. The gel needs to be inserted by means of a special application system. Furthermore, although it is proven to be effective against bacteria in the deep periodontal pockets, it is not suitable for a complete therapy and does not substitute classical treatment measures (Eickholz, P et al.; *J Clin Periodontol* 2002; 108-117; Ratka-Kruger, P. et al., *J Periodontol.* 2005/1,76: 66-74). Additionally, due to the high costs and low incentive for the dentists, a general application of this therapy appears to be difficult. Periochip® contains 2.5 mg of chlorhexidine in a biodegradable gelatin chip that can be inserted into the periodontal pockets with tweezers. The chip remains in the pocket for 7-10 days and over time, the drug is released continuously. However, it was found to be not as effective against the bacterial composition as local antibiotics. Further, the costs are not paid by the health insurance. In summary, although some improvement of periodontitis parameters (depth of the pocket and inflammation parameters) has been achieved with these systems, they require complicated application and furthermore are not reimbursed by the public health insurance companies in Germany such that they cause unbearable costs which have to be paid by the patients.

The systemic application of low-dose doxycycline (Periostat®) as a long-term therapy has also been applied. However, the expected pharmacologic effect does not always correlate to a successful clinical result. For instance, therapy seems to have diminished efficacy in smokers. Furthermore, a high level of compliance on the side of the patient is required; and the results of scientific studies as to whether a clinical improvement is present are controversial.

Thus, no general recommendation can be given concerning this therapy (G. Greenstein, Efficacy of submicrobial-dose doxycycline in the treatment of periodontal diseases: a critical evaluation, *The international journal of Periodontics & Restorative Dentistry*, 2004, 24(6):528-543; I. Needleman et al., A randomized-controlled trial of low-dose doxycycline for periodontitis in smokers, *Journal of clinical Periodontology*, 2007, 34(4):325-333).

Finally, Arestin® is a subgingival sustained-release product composed of microspheres containing the antibiotic minocycline hydrochloride incorporated into a bioresorbable polymer, poly(glycolide-co-DL-lactide) or PGLA, for professional subgingival administration into periodontal pockets. Each unit-dose cartridge delivers minocycline hydrochloride equivalent to 1 mg of minocycline free base. The continuous drug release is described to be 14 days. Nevertheless, the product is no longer available on the German market. The consistency of the material (microspheres) requires application by using special cartridges and renders its handling and placement into the periodontal pocket difficult and not very reliable.

As here presented, there are a few effective therapeutic options, but they all offer opportunities for improvement. Thus, there is a high demand for the development of novel, improved forms for administration of tetracycline antibiotics with sustained activity, in particular for the treatment of periodontitis and related conditions. An ideal drug delivery system for the treatment of periodontitis should combine a simple production, an easy application, the absence of solvents and a controlled release over a prolonged period with a high bioactivity.

Problems to be Solved by the Invention

In view of the above, the present invention aims at providing a form for administration of tetracycline compounds having increased stability; and/or prolonged activity; and/or simpler, easier and/or more reliable applicability and handling. In particular, the present invention aims at providing topical application forms allowing a dentist to apply an antibiotic in a simple, reliable and as painless as possible manner. Further, significantly prolonged and uniform release is aimed at, such that the required activity level is maintained over a prolonged period of time (i.e. beyond 14 days). Finally, it would be desirable that the new forms for administration are preferably safe, reliable and sufficiently cheap to be reimbursed by the public health insurance.

Further objects of the present invention are the provision of a method for manufacturing such administration forms; the provision of a method for treatment of the human or animal body, and/or a compound or a pharmaceutical preparation for use in such method; the provision of a method for therapy or prophylaxis of a bacterial infection, and/or a compound or a pharmaceutical preparation for use in such method; the provision of a method for therapy or prophylaxis of an acute, chronic or recurrent periodontal disease and/or a compound or a pharmaceutical preparation compound for use in in such method.

SUMMARY OF THE INVENTION

The present invention provides a complex comprising a tetracycline compound (TC) or a pharmaceutically acceptable salt thereof and a divalent metal carboxylate ($MA_2$), wherein: the molar ratio TC:$MA_2$ is in the range of 1:0.8-3.0; the divalent metal cation M is an earth alkaline metal cation; and A is a carboxylate anion derived from a $C_8$-$C_{24}$ carboxylic acid.

The present invention further provides a pharmaceutical preparation comprising the complex according to any one of aspects 1-4 and optionally one or more pharmaceutically acceptable excipient(s), preferably in the form of a strand-shaped extrudate The present invention further provides a method for manufacturing said complex, the method comprising the following steps: (a) mixing a tetracycline compound (TC) or a pharmaceutically acceptable salt thereof and a divalent metal carboxylate ($MA_2$) in a molar ratio of 1:0.8-3.0 with an organic solvent to obtain a dispersion, wherein the divalent metal cation M is an earth alkaline metal cation and A is a carboxylate anion derived from a $C_8$-$C_{24}$ carboxylic acid; (b) heating said dispersion to form the complex; (c) removing the solvent to obtain the complex. The present invention further provides a method for manufacturing the pharmaceutical preparation in the form of a strand-shaped extrudate, the method comprising the following steps: (d) comminuting said complex and, if present, one or more pharmaceutically acceptable excipients to obtain an extrusion precursor; (e) extruding said extrusion precursor at a temperature above room temperature; (f) cooling the product of step (e) to obtain the pharmaceutical preparation in the form of a strand-shaped extrudate.

The present invention further provides a complex as defined above and/or a pharmaceutical preparation as defined above for use in a method for treatment of the human or animal body; and/or for use in a method for therapy and/or prophylaxis of a bacterial infection, preferably caused by one or more bacteria selected from the group consisting of *Porphyromonas gingivalis*, *Prevotella intermedia*, *Tannerella forsythia*, *Streptococcus gordonii*, *Fusobacterium nucleatum*, *Actinomyces naeslundii* and *Parvimonas micra*; and/or wherein antibiotic activity is maintained over a period of at least 21 days; and/or for use in a method for therapy and/or prophylaxis of an acute, chronic or recurrent periodontal disease.

Effects Achieved by the Invention

The present inventors found that the complexes of tetracycline compounds according to the present invention degrade more slowly in aqueous environments than the corresponding tetracycline compounds. Furthermore, these complexes were found to have a lower solubility in water and to provide a more delayed and sustained release as compared to the corresponding tetracycline compounds or even to sustained release systems, such as Arestin®. Although chelate complexes of tetracycline compounds with magnesium or calcium ions in a ratio of 1:0.5 have been previously described, the present complexes are different in term of their stoichiometry. The complexation according to the present invention results in modified chemical properties of the compounds. In particular, the solubility, the photometric behavior and the reactivity are influenced in a favorable manner. The active substance remains biologically active over a prolonged period of time and is released in a retarded manner due to the lower solubility in water, increased stability towards degradation in aqueous solution and at the lipophilic nature of the carboxylate anion. Furthermore, the complex formation seems to prevent a conversion of the tetracycline compounds into less active epimers and thus contributes to maintaining the biological activity of the active substances over a longer period of time. These effects can be maintained when the complexes according to the present invention are administered either alone or in combination with one or more pharmaceutical excipients in a pharmaceutical preparation, e.g., a preparation for topical administration.

Moreover, when the complex is provided in a pharmaceutical preparation such as an extrudate (either as a pure substance or together with an excipient, e.g., a biodegradable polymer), an even longer release and activity can be achieved. Such extrudates can be easily formed and handled (e.g., in order to be brought into a periodontal pocket) and additionally result in a yet further delay of drug release. Finally, they exhibit good adhesion to the oral mucosa and thus excellent application reliability.

The manufacture method described herein leads to the formation of novel tetracycline compound complexes with surprisingly pronounced sustained drug release that is therapeutically desirable. Furthermore, the complexes obtained according to the manufacture method of the present invention have an increased solubility in organic solvents and decreased water solubility. The methods for manufacturing the complexes and preparations according to present invention are simple, versatile, do not require the use of toxic organic solvents, and can be based exclusively on using well established, reliable and safe pharmaceutical ingredients. Furthermore, the complexes according to the present invention are easily formable and can be processed by extrusion, either alone or together with one or more excipient in order to be converted into extrudate having a suitable desired geometry, e.g., suitable for easier placement into a periodontal pocket.

The complexes and preparations were shown to be superior in terms of release behavior and sustained antibacterial activity, especially against oral pathogens associated with the occurrence and progress of periodontitis. This can contribute to an increased efficacy of non-surgical periodontitis therapy and consequently to a decreased amount of surgical treatment necessary, along with a significant cost reduction. Additionally, the burden for the patient caused by treatment with systemically administered antibiotics can be reduced by the substitution for an effective locally applied therapeutic form instead.

DETAILED DESCRIPTION OF THE INVENTION

Complexes

Figure 1:
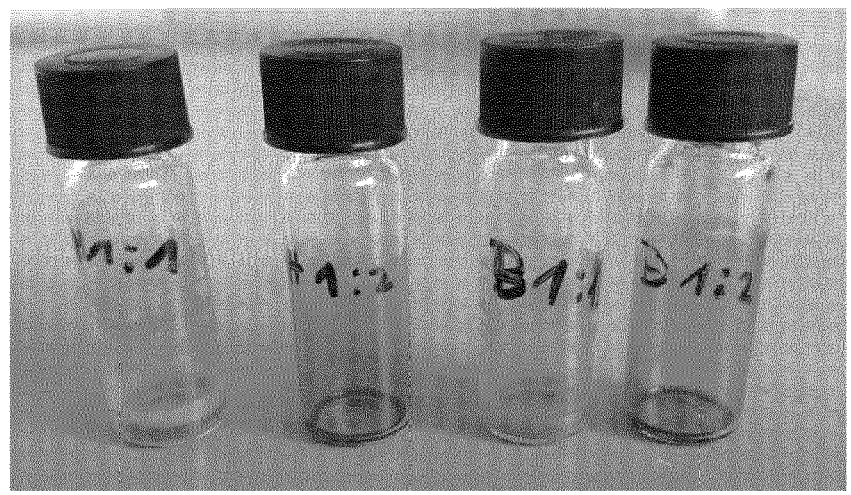
FIG. 1 shows glass vials with dried minocycline/magnesium stearate complexes in different molar ratios. From left to right: minocycline hydrochloride/magnesium stearate in molar ratios of 1:1, 1:2; minocycline free base/magnesium stearate in ratios of 1:1 and 1:2 (corresponding to Examples 4, 3, 2 and 1, respectively).

The present invention provides a complex comprising a tetracycline compound (TC) or a pharmaceutically acceptable salt, hydrate or solvate thereof and a divalent metal carboxylate ($MA_2$), wherein: the molar ratio TC:$MA_2$ is in the range of 1:0.8-3.0; the divalent metal cation M is an earth alkaline metal cation; and A is a carboxylate anion derived from a $C_8$-$C_{24}$ carboxylic acid.

A major problem with the controlled release of tetracyclines represents their chemical instability in water. For example, minocycline shows epimerization reactions with loss of activity. Also doxycycline degrades in an aqueous environment. Therefore, drug degradation prior release should be avoided. We established the hypothesis that the formation of a lipophilic complex might increase the stability of the drug and lead to prolonged release times.

Tetracycline Compounds

As used herein, the term "tetracycline compound" (TC) refers to any compound belonging to the family of tetracycline antibiotics, i.e. based on the 6-deoxy-6-demethyltetracycline minimum pharmacophore structure:

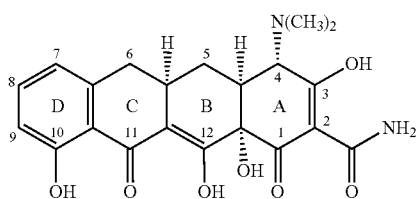

Preferably, the tetracycline compound (TC) is selected from minocycline, doxycycline, tetracycline, chlortetracycline, oxytetracycline, rolitetracycline, tigecycline, demeclocycline, lymecycline, meclocycline, methacycline, omadacycline, sarecycline and eravacycline. Preferred tetracycline compounds are also selected from the group consisting of 7-chlortetracycline, 5-hydroxytetracycline, tetracycline, 6-demethyl-7-chlortetracycline, 2-N-pyrrolidinomethyltetracycline, 2-N-lysinomethyltetracycline, N-methylol-7-chlortetracycline, 6-methylene-5-hydroxytetracycline (methacycline), 6-deoxy-5-hydroxytetracycline (doxycycline), 7-dimethylamino-6-demethyl-6-deoxytetracycline (minocycline), 9-(N,N-dimethylglycylamido)-6-demethyl-6-deoxytetracycline, 9-(N,N-dimethylglycylamido)-minocycline, 9-(t-butylglycylamido)-minocycline (tigecycline), as further described in Table 2 of Chopra et al., *Microbiol Mol Biol Rev.* 2001, June 65(2):232-60). Further preferred tetracycline compounds include clomocycline (N-methylol-7-chlortetracycline), 9-(N,N-dimethylglycylamido)-6-demethyl-6-deoxytetracycline and 9-(N,N-dimethylglycylamido)-minocycline.

It should be noted that the term "tetracycline compound" or "TC" as used herein denotes the general class of compounds, namely any compound belonging to the family of tetracycline antibiotics, whereas the term "tetracycline" only denotes the specific, preferred compound (4S,4aS,5aS,12aS)-4-(dimethylamino)-1,4,4a,5,5a,6,11,12a-octahydro-3,6,10,12,12a-pentahydroxy-6-methyl-1,11-dioxo-2-naphthacenecarboxamide:

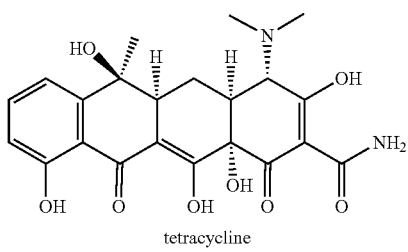 [SMILES: CN(C)[C@@H]1C(O)=C(C(N)=O)C(=O)[C@@]2(O)C(O)=C3C(=O)c4c(O)cccc4[C@@](C)(O)[C@H]3C[C@@H]12]
tetracycline

Preferably, the tetracycline compound (TC) is selected from minocycline, doxycycline, tetracycline, chlortetracycline, oxytetracycline, rolitetracycline, tigecycline, demeclocycline, lymecycline, meclocycline, methacycline, omadacycline, sarecycline, eravacycline, clomocycline, 9-(N,N-dimethylglycylamido)-6-demethyl-6-deoxytetracycline and 9-(N,N-dimethylglycylamido)-minocycline. These antibiotics have the advantage of being safe, clinically established and thus reliable and likely to be suitable for various therapeutic applications as described herein.

Most preferably, the tetracycline compound is minocycline (7-dimethylamino-6-demethyl-6-deoxytetracycline or (4S,4aS,5aR,12aR)-4,7-bis(dimethylamino)-1,10,11,12a-tetrahydroxy-3,12-dioxo-4a,5,5a,6-tetrahydro-4H-tetracene-2-carboxamide) or doxycycline (6-deoxy-5-hydroxytetracycline or (4S,4aR,5S,5aR,6R,12aR)-4-(dimethylamino)-1,5,10,11,12a-pentahydroxy-6-methyl-3,12-dioxo-4a,5,5a,6-tetrahydro-4H-tetracene-2-carboxamide), and yet further preferably minocycline.

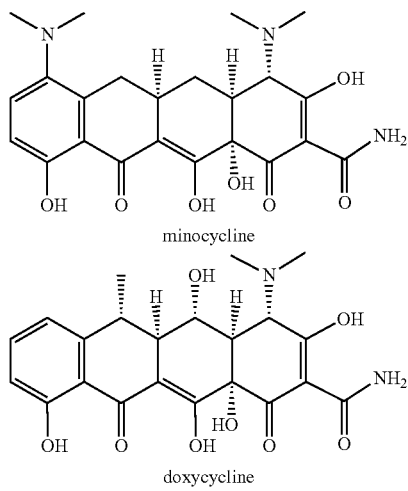

These antibiotics have the additional advantage that their applicability in the treatment of periodontal diseases is clinically established.

Molar Ratio

The molar ratio $TC:MA_2$ is preferably in the range of 1:0.8-3.0. The present inventors found that the predominate species obtained when preparing the complexes according to the present invention are those wherein $TC:MA_2$ is 1:1 or 1:2. Thus, it is intended that also mixtures wherein the molar ratio $TC:MA_2$ is between 1:1 and 1:2 are also within the scope of the present invention. A minor excess of TC, e.g., wherein $TC:MA_2=1:0.8$, is also within the scope of the present invention. Similarly, an excess of $MA_2$, e.g., beyond a ratio of $TC:MA_2$ of 1:2 or even 1:3, is also considered to be within the scope of the present invention, regardless of whether the excess metal cations are coordinated to the TC. Thus, also such mixtures containing complexes with a defined ratio of $TC:MA_2$ together with a certain excess of one of the components are also intended to be covered by the definition of the complex according to the present invention. Preferably, $TC:MA_2$ is 1:1 or 1:2; more preferably $TC:MA_2$ is 1:2. Further preferable ranges for the molar ratio $TC:MA_2$ are, for instance, 1:0.7-1:1.2, 1:0.7-1:1.1, 1:0.8-1:1.1, 1:0.9-1:1.2, 1:0.9-1:1.1, 1:1.1-1:2.9, 1:1.4-2.5, and 1:1.8-1:2.2; more preferably 1:0.9-1:1.1 and/or 1:1.9-1:2.1.

Carboxylate Anion

A is a carboxylate anion derived from a $C_8$-$C_{24}$ carboxylic acid. The lipophilic nature of the carboxylate anion contributes to improving the sustained release of the tetracycline antibiotic from the complexes and preparations according to the present invention.

The carboxylic acid can be saturated or unsaturated. Preferably, A is a carboxylate anion derived from a carboxylic acid selected from arachidic acid ($C_{20}$), stearic acid ($C_{18}$), palmitic acid ($C_{16}$), myristic acid ($C_{14}$), lauric acid ($C_{12}$), capric acid ($C_{10}$), caprylic acid ($C_8$), hydroxystearic acid, oleic acid, linoleic acid, linolenic acid and ricinoleic acid. The hydroxystearic acid can be preferably 10-hydroxystearic acid or 12-hydroxystearic acid. Most preferably, the carboxylate anion is stearate ($C_{18}$).

Pharmaceutically Acceptable Salts, Hydrates and Solvates

As used herein, the term "pharmaceutically acceptable" embraces both human and veterinary use. For example, the term "pharmaceutically acceptable" embraces a veterinarily acceptable compound or a compound acceptable in human medicine and health care. Salts, hydrates and solvates of the tetracycline compounds are those wherein the counter-ion or associated solvent is pharmaceutically acceptable. However, salts, hydrates and solvates having non-pharmaceutically acceptable counter-ions or associated solvents are within the scope of the present invention, for example, for use as intermediates in the preparation of other compounds and their pharmaceutically acceptable salts, hydrates and solvates. Suitable salts include those formed with either organic and inorganic acids or bases. Pharmaceutically acceptable acid addition salts include those formed from hydrochloric, hydrobromic, sulfuric, nitric, citric, tartaric, phosphoric, lactic, pyruvic, acetic, trifluoroacetic, triphenylacetic, sulfamic, sulfanilic, succinic, oxalic, fumaric, maleic, malic, mandelic, glutamic, aspartic, oxaloacetic, methanesulfonic, ethanesulfonic, arylsulfonic (for example p-toluenesulfonic, benzenesulfonic, naphthalenesulfonic or naphthalenedisulfonic), salicylic, glutaric, gluconic, tricarballylic, cinnamic, substituted cinnamic (for example, phenyl, methyl, methoxy or halo substituted cinnamic, including 4-methyl and 4-methoxycinnamic acid), ascorbic, oleic, naphthoic, hydroxynaphthoic (for example 1- or 3-hydroxy-2-naphthoic), naphthaleneacrylic, benzoic, 4-methoxybenzoic, 2- or 4-hydroxybenzoic, 4-chlorobenzoic, 4-phenylbenzoic, benzeneacrylic (for example 1,4-benzenediacrylic), isethionic acids, perchloric, propionic, glycolic, hydroxyethanesulfonic, pamoic, cyclohexanesulfamic, salicylic, saccharinic and trifluoroacetic acid. Particularly preferred acid addition salts are hydrochloride, hyclate (hydrochloride hemiethanolate hemihydrate, $\cdot HCl \cdot \frac{1}{2}EtOH \cdot \frac{1}{2}H_2O$) and acid addition salts formed from maleic or oxalic acid. Pharmaceutically acceptable base salts include ammonium salts, alkali metal salts such as those of sodium and potassium, alkaline earth metal salts such as those of calcium and magnesium and salts with organic bases such as dicyclohexylamine and N-methyl-D-glucamine. All pharmaceutically acceptable acid addition salt forms of the compounds of the present invention are intended to be embraced by the scope of the present invention.

The complex is formed of a tetracycline compound (TC) or a pharmaceutically acceptable salt, hydrate or solvate thereof, and a divalent metal carboxylate ($MA_2$), In a preferred embodiment, the ratio $TC:MA_2$ is 1:2; and/or M is selected from $Mg^{2+}$ and $Ca^{2+}$; and/or A is a carboxylate anion derived from a carboxylic acid selected from arachidic acid ($C_{20}$), stearic acid ($C_{18}$), palmitic acid ($C_{16}$), myristic acid ($C_{14}$), lauric acid ($C_{12}$), capric acid ($C_{10}$), caprylic acid ($C_8$), hydroxystearic acid, oleic acid, linoleic acid, linolenic acid and ricinoleic acid. Preferably, the complex consists of said tetracycline compound (TC) or a pharmaceutically acceptable salt, hydrate or solvate thereof, and the divalent metal carboxylate ($MA_2$), In a further preferred embodiment, the complex has the formula $[(TC) \cdot 2(MgA_2)]$, wherein the tetracycline compound (TC) is minocycline or a pharmaceutically acceptable salt thereof. Preferably, TC is minocycline free base or minocycline hydrochloride, and A is stearate.

Pharmaceutical Preparations

The present invention provides a pharmaceutical preparation comprising the complex as described above and optionally one or more pharmaceutically acceptable excipient(s).

As used herein, the term "pharmaceutical preparation" is intended to encompass a product comprising the claimed compounds in the therapeutically effective amounts, as well as any product that results, directly or indirectly, from combinations of the claimed compounds.

In the pharmaceutical preparation according to the present invention, the total content of the tetracycline compound (TC) is preferably in the range of 5-30 wt. %, 30-50 wt. %, more preferably 8-28 wt. %, 32-48 wt. %, further preferably 10-20 wt. %, yet further preferably 11-15 wt. %, still further preferably 11.5±5 wt. %, 27.9 wt. %±5 wt. %, 11.5±2 wt. %, 27.9 wt. %±2 wt. %, 11.7-14.75 wt. %, 15.25-19.75 wt. %, and most preferably 11.5 wt. % or 27.9 wt. %, Furthermore, the overall content of the tetracycline complex (preferably, the complex having the formula $[(TC) \cdot 2(MgA_2)]$) in the pharmaceutical preparation is in the range of 5-95 wt. %, more preferably 10-80 wt. %, further preferably 15-75 wt. %, yet further preferably 20-60 wt. %, still further preferably 30-50 wt. %, and most preferably 41.2 wt. %.

Excipients

As used herein, the term "excipient" refers to a carrier, a binder, a disintegrator and/or a further suitable additive for a galenic formulation, such as extrudate, cream, gel, emulsion, suspension, liniment, ointment, powder, paste, balm, lotion, eye drops, spray, topical aerosol, topical solution, topical suspension, skin patch and nonwoven. Carriers, which can be added to the mixture, include necessary and inert pharmaceutical excipients, including, but not limited to, suitable release retardants, suspending agents, lubricants, flavorants, sweeteners, preservatives, coatings, granulating agents, dyes, and coloring agents.

A particularly preferable class of excipients are biodegradable polymers, which will be discussed in greater detail below.

Further preferable types of excipients are emulsifiers, such as glycerol monostearate, which may be present preferably in an amount of 5 to 15 wt. %, more preferably 8 to 12 wt. %, most preferably 10 wt. %. By adding such excipients, the release behavior of the preparations, in particular extrudates, can be modulated (e.g., accelerated).

Further preferable types of excipients are plasticizers, such as polyethylene glycol (PEG), which may be present preferably in an amount of 5 to 15 wt. %, more preferably 8 to 12 wt. %, most preferably 10 wt. %. A preferable type of plasticizer is PEG 1500. By adding such excipients, the mechanical behavior of the preparations, in particular of extrudates, can be modulated (e.g., brittleness and/or a tendency towards hardening over time can be reduced).

Routes of Administration and Types of Preparations

Preferably, the pharmaceutical preparation according to the present invention is arranged for topical administration. Topical administration means application to body surfaces such as the skin or mucous membranes to treat ailments via a large range of classes including creams, foams, gels, lotions, and ointments. Many topical medications are epicutaneous, meaning that they are applied directly to the skin. Topical medications may also be inhalational, such as asthma medications, or applied to the surface of tissues other than the skin, such as eye drops applied to the conjunctiva, or ear drops placed in the ear, or medications applied to the surface of a tooth, gum or periodontal pocket.

Further preferably, the pharmaceutical preparation is selected from the group consisting of extrudate, particle, granule, powder, film, strip, compact, chip, paste, cream, gel, emulsion, suspension, liniment, ointment, balm, lotion, eye drops, spray, topical aerosol, topical solution, topical suspension, skin patch and nonwoven. Yet further preferably, the pharmaceutical preparation is arranged for application into a periodontal pocket.

Extrudates

We aimed to develop hot-melt extrudates that emulate the ideals that an ideal drug delivery system for the treatment of periodontitis should combine a simple production, an easy application, the absence of solvents and a controlled release over a prolonged period with a high bioactivity. Hot melt extrusion is a favorable technique because it is a continuous and well established process in the pharmaceutical industry. The dimensions and shapes can be adapted by the extrusion parameters. In addition, the flexibility and swelling behavior can be modified by appropriate selections of the excipients. The extrudates can be cut to the appropriate length. The insertion of the extrudates is an easy and fast process. It requires—in contrast to the application of microparticles and highly viscous gels—no special device.

Figure 9:
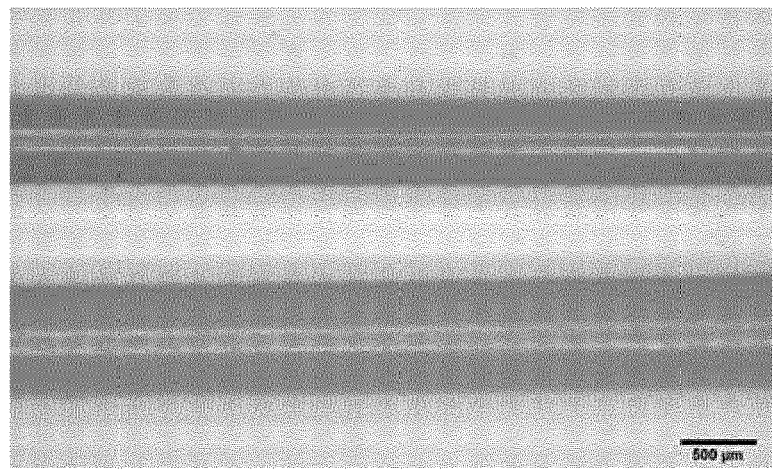
FIG. 9 shows a photograph of extrudates obtained according to the present invention comprising Resomer 502 RG (top) and Resomer 503 RG (bottom) containing 11.5% minocycline. Both extrudates were extruded with the 600 µm extrusion device. The larger diameter of the 503 RG extrudate indicates the viscoelastic properties of the polymer.

As used herein, the term "extrudate" refers to any material that has been extruded through a die. Specifically, extrudates refer to dosage forms obtained by shaping a precursor by extrusion into rods which can be either cut into pieces or used as such, e.g. as a sustained release dosage form for topical or a different route of administration. Preferably, the pharmaceutical preparation is in the form of a strand-shaped extrudate, e.g., as shown in FIG. 9. The strand-shaped extrudate preferably has an essentially circular or an essentially elliptical cross section, and/or a maximum cross-sectional diameter in the range of 0.1-10 mm, 0.2-5 mm, 0.3-1 mm, 0.4-0.8 mm, 0.3-0.6 mm, more preferably 0.2-5 mm, further preferably 0.3-1 mm, yet further preferably 0.4-0.8 mm, most preferably 0.3-0.6 mm, 0.3, 0.4, 0.5 or 0.6 mm. A suitable diameter allows for easy, pain-free and reliable placement into a periodontal pocket of a given size.

Biodegradable Polymers

The pharmaceutical preparation according to the present invention preferably comprises, as a possible excipient, one or more biodegradable polymer(s). These may be selected from biodegradable polyesters, such as poly(glycolic acid) (PGA), poly(lactic acid) (PLA), poly(lactic-co-glycolic acid) (PLGA), polyhydroxybutyric acid (PHB) or poly-caprolactone (PCL); mixed biodegradable polyesters, such as PLA-PCL and PLGA-PCL; biodegradable PEGylated diblock (AB) or triblock (ABA or BAB) copolymers, such as PEG-PLA, PEG-PLGA, PEG-PCL and PEG-PCL-PLGA; and pectins, Poly(glycolic acid) (PGA), Poly(lactic acid) (PLA) and their copolymers are biodegradable polyesters suitable for use the present invention. They degrade in the body by simple hydrolysis of the ester backbone to non-harmful and non-toxic compounds. The degradation products are either excreted by the kidneys or eliminated as carbon dioxide and water through well-known biochemical pathways. Since PLA/PGA polymers are considered safe, non-toxic and biocompatible by regulatory agencies in virtually all developed countries, additional applications of these materials can be brought to market sooner and are more cost effective than those utilizing novel polymers with unproven biocompatibility. Examples of PLA/PGA polymers suitable for use in the present invention are for instance the RESOMER polymers manufactured by Evonik Röhm Pharma GmbH shown in Table 1 below (RESOMER® Biodegradable Polymers for Medical Device Applications Research. RESOMER® Materials by Evonik Rohm GmbH).

Poly(glycolic acid) (PGA),

PGA is a highly crystalline material with a high melting point (225-230° C.) and variable solubility in organic solvents that is generally low and depends on polymer molecular weight. It is still susceptible to hydrolysis due to the ester bond in the polymer backbone. In spite of its low solubility, this polymer has been fabricated into a variety of forms and structures. Techniques used to develop PGA-based structures include extrusion, injection and compression molding as well as particulate leaching and solvent casting. Fibers of PGA have a high strength and modulus and are particularly rigid.

Poly(lactic acid) (PLA)

Unlike glycolide, lactide is a chiral molecule and exists in two distinct optically active forms—L-lactide and D-lactide. When each of these monomers is polymerized, the resulting polymer is semi-crystalline. Polymerization of a racemic mixture of L- and D-lactides forms poly-D,L-lactide (PDLLA), which is amorphous and has a glass transition temperature of 55-60° C. The degree of crystallinity can be tuned by altering the ratio of D to L enantiomers within the polymer. Selection of the PLA stereochemistry can have a major effect on the polymer properties, processability and biodegradability. Poly (L-lactide) or PLLA is often the polymer of choice for cast/extruded biomedical devices because it breaks down into L(+)-lactic acid units, which is the naturally occurring stereoisomer and is therefore excreted with minimal toxicity.

Poly (Lactide-co-Glycolide) Copolymers (PLGA)

Both L- and DL-lactides have been used for co-polymerization. The ratio of glycolide to lactide at different compositions allows control of the degree of crystallinity of the polymers. When the crystalline PGA is co-polymerized with PLA, the degree of crystallinity is reduced and as a result this leads to increases in rates of hydration and hydrolysis. It can therefore be concluded that the degradation time of the copolymer is related to the ratio of monomers used in synthesis. In general, the higher the content of glycolide, the quicker the rate of degradation. However, an exception to this rule is the 50:50 ratio of PGA:PLA, which exhibits the fastest degradation.

As end groups, three types of end-groups functional groups are preferred: (i) free carboxylic acid group, (ii) ester terminated group, (iii) alkyl ester group. Polymers capped with ester terminated and alkyl ester groups typically show longer degradation lifetimes than the free carboxylic analogs.

TABLE 1

RESOMER ® Biodegradable Polymers

| Product No. | RESOMER Type | Product Name | Molecular Weight Range | Viscosity [dl/g] |
|---|---|---|---|---|
| 719854 | RESOMER L 206 S | Poly(L-lactide) | — | 0.8-1.2 |
| 719951 | RESOMER R 202 S | Poly(D,L-lactide) | 10,000-18,000 | 0.16-0.24 |

TABLE 1-continued

RESOMER ® Biodegradable Polymers

| | | | | |
|---|---|---|---|---|
| 719978 | RESOMER R 202 H | Poly(D,L-lactide) | 10,000-18,000 | 0.16-0.24 |
| 719935 | RESOMER R 203 S | Poly(D,L-lactide) | 18,000-28,000 | 0.25-0.35 |
| 719943 | RESOMER R 203 H | Poly(D,L-lactide) | 18,000-28,000 | 0.25-0.35 |
| 719889 | RESOMER RG 502 | Poly(D,L-lactide-co-glycolide) 50:50 | 7,000-17,000 | 0.16-0.24 |
| 719897 | RESOMER RG 502 H | Poly(D,L-lactide-co-glycolide) 50:50 | 7,000-17,000 | 0.16-0.24 |
| 739952 | RESOMER RG 503 | Poly(D,L-lactide-co-glycolide) 50:50 | 24,000-38,000 | 0.32-0.44 |
| 719870 | RESOMER RG 503 H | Poly(D,L-lactide-co-glycolide) 50:50 | 24,000-38,000 | 0.32-0.44 |
| 739944 | RESOMER RG 504 | Poly(D,L-lactide-co-glycolide) 50:50 | 38,000-54,000 | 0.45-0.60 |
| 719900 | RESOMER RG 504 H | Poly(D,L-lactide-co-glycolide) 50:50 | 38,000-54,000 | 0.45-0.60 |
| 739960 | RESOMER RG 505 | Poly(D,L-lactide-co-glycolide) 50:50 | 54,000-69,000 | 0.61-0.74 |
| 719862 | RESOMER RG 653 H | Poly(D,L-lactide-co-glycolide) 50:50 | 24,000-38,000 | 0.32-0.44 |
| 719919 | RESOMER RG 752 H | Poly(D,L-lactide-co-glycolide) 50:50 | 4,000-15,000 | 0.14-0.22 |
| 719927 | RESOMER RG 756 S | Poly(D,L-lactide-co-glycolide) 50:50 | 76,000-116,000 | 0.71-1.0 |
| 739979 | RESOMER RG 858 S | Poly(D,L-lactide-co-glycolide) 50:50 | 190,000-240,000 | 1.3-1.7 |
| 719846 | RESOMER X | Polydioxanone | — | 1.5-2.2 (0.1% in HFIP, 30° C.) |

| Product No. | Application | Tg [° C.] | Tm [° C.] | End Group |
|---|---|---|---|---|
| 719854 | Medical Device | 60-65 | 180-185 | ester terminated |
| 719951 | Controlled Release | 38-42 | amorphous | ester terminated |
| 719978 | Controlled Release | 44-48 | amorphous | free carboxylic |
| 719935 | Controlled Release | 46-50 | amorphous | ester terminated |
| 719943 | Controlled Release | 48-52 | amorphous | free carboxylic |
| 719889 | Controlled Release | 42-46 | amorphous | alkyl ester |
| 719897 | Controlled Release | 42-46 | amorphous | free carboxylic |
| 739952 | Controlled Release | 44-48 | amorphous | ester |
| 719870 | Controlled Release | 44-48 | amorphous | free carboxylic |
| 739944 | Controlled Release | 46-50 | amorphous | ester |
| 719900 | Controlled Release | 46-50 | amorphous | free carboxylic |
| 739960 | Controlled Release | 48-52 | amorphous | ester |
| 719862 | Controlled Release | 46-50 | amorphous | free carboxylic |
| 719919 | Controlled Release | 42-46 | amorphous | free carboxylic |
| 719927 | Controlled Release | 49-55 | amorphous | ester terminated |
| 739979 | Controlled Release | — | amorphous | alkyl ether |
| 719846 | Medical Device | (−10)-(−5) | 110-115 | — |

*Inherent Viscosity [dl/g], (0.1% in CHCl$_3$, 25° C., except where noted)

Further suitable biodegradable polymers for use in the present invention are available under the name EXPANSORB® from Merck KGaA (PLA & PLGA Polymer Portfolio for Peptide & Small Molecule Formulation):

TABLE 2

EXPANSORB ® Biodegradable Polymers

| Product | Order No. | Poly (D,L-lactic acid) (PLA) | Ratio L/DL | End group | I.V. range (dL/g, CHCl$_3$, 25° C.) | MW (indicative range, kDa) |
|---|---|---|---|---|---|---|
| EXPANSORB ® DL 100-1A | 5.43108 | PDLLA | 0/100 | COOH | 0.05-0.20 | 6-20 |
| EXPANSORB ® DL 100-2A | 5.43109 | PDLLA | 0/100 | COOH | 0.15-0.30 | 10-25 |
| EXPANSORB ® DL 100-5A | 5.43110 | PDLLA | 0/100 | COOH | 0.40-0.60 | 45-80 |
| EXPANSORB ® DL 100-7A | 5.43111 | PDLLA | 0/100 | COOH | 0.60-0.80 | 70-120 |
| EXPANSORB ® DLL 10-15A | 5.43112 | P(L/DL)LA | 90/10 | COOH | 1.30-1.70 | 200-250 |
| EXPANSORB ® DL 100-2E | 5.43113 | PDLLA | 0/100 | ESTER | 0.15-0.30 | 10-25 |

| Product | Order No. | Poly(D,L-lactic-co-glycolic acid) (PLGA) | Ratio L/DL | End group | I.V. range (dL/g, CHCl$_3$, 25° C.) | MW (indicative range, kDa) |
|---|---|---|---|---|---|---|
| EXPANSORB ® DLG 45-2A | 5.43114 | PLGA | 45/55 | COOH | 0.15-0.30 | 15-30 |
| EXPANSORB ® DLG 50-2A | 5.43115 | PLGA | 50/50 | COOH | 0.15-0.25 | 5-20 |
| EXPANSORB ® DLG 50-3A | 5.43116 | PLGA | 50/50 | COOH | 0.25-0.40 | 15-40 |
| EXPANSORB ® DLG 50-5A | 5.43117 | PLGA | 50/50 | COOH | 0.40-0.55 | 42-65 |
| EXPANSORB ® DLG 50-6A | 5.43118 | PLGA | 50/50 | COOH | 0.55-0.65 | 60-85 |
| EXPANSORB ® DLG 50-8A | 5.43119 | PLGA | 50/50 | COOH | 0.65-0.90 | 80-130 |
| EXPANSORB ® DLG 55-5A | 5.43120 | PLGA | 55/45 | COOH | 0.40-0.50 | 42-65 |
| EXPANSORB ® DLG 65-3A | 5.43121 | PLGA | 65/35 | COOH | 0.25-0.35 | 15-40 |
| EXPANSORB ® DLG 65-6A | 5.43122 | PLGA | 65/35 | COOH | 0.50-0.65 | 45-85 |

TABLE 2-continued

EXPANSORB ® Biodegradable Polymers

| | | | | | | |
|---|---|---|---|---|---|---|
| EXPANSORB ® DLG 75-2A | 5.43124 | PLGA | 75/25 | COOH | 0.08-0.21 | 5-20 |
| EXPANSORB ® DLG 75-5A | 5.43125 | PLGA | 75/25 | COOH | 0.38-0.64 | 37-84 |
| EXPANSORB ® DLG 75-7A | 5.43126 | PLGA | 75/25 | COOH | 0.60-0.70 | 65-85 |
| EXPANSORB ® DLG 75-8A | 5.43127 | PLGA | 75/25 | COOH | 0.70-0.90 | 76-130 |
| EXPANSORB ® DLG 75-10A | 5.43123 | PLGA | 75/25 | COOH | 0.80-1.10 | 110-166 |
| EXPANSORB ® DLG 85-2A | 5.43129 | PLGA | 85/15 | COOH | 0.15-0.25 | 10-15 |
| EXPANSORB ® DLG 85-7A | 5.43128 | PLGA | 85/15 | COOH | 0.55-0.75 | 65-95 |
| EXPANSORB ® DLG 90-5A | 5.43130 | PLGA | 90/10 | COOH | 0.35-0.55 | 30-70 |
| EXPANSORB ® DLG 90-7A | 5.43131 | PLGA | 90/10 | COOH | 0.60-0.75 | 50-95 |
| EXPANSORB ® DLG 95-2A | 5.43132 | PLGA | 95/5 | COOH | 0.15-0.25 | 5-20 |
| EXPANSORB ® DLG 95-4A | 5.43133 | PLGA | 95/5 | COOH | 0.25-0.50 | 35-60 |
| EXPANSORB ® DLG 50-2E | 5.43134 | PLGA | 50/50 | ESTER | 0.15-0.25 | 5-20 |
| EXPANSORB ® DLG 50-6E | 5.43135 | PLGA | 50/50 | ESTER | 0.55-0.65 | 60-85 |
| EXPANSORB ® DLG 50-7E | 5.43136 | PLGA | 50/50 | ESTER | 0.60-0.70 | 70-100 |
| EXPANSORB ® DLG 65-6E | 5.43137 | PLGA | 65/35 | ESTER | 0.50-0.65 | 45-85 |
| EXPANSORB ® DLG 75-2E | 5.43138 | PLGA | 75/25 | ESTER | 0.15-0.30 | 10-25 |
| EXPANSORB ® DLG 75-4E | 5.43139 | PLGA | 75/25 | ESTER | 0.30-0.50 | 25-60 |
| EXPANSORB ® DLG 75-7E | 5.43140 | PLGA | 75/25 | ESTER | 0.66-0.80 | 80-115 |
| EXPANSORB ® DLG 75-9E | 5.43141 | PLGA | 75/25 | ESTER | 0.75-1.00 | 100-160 |
| EXPANSORB ® DLG 85-7E | 5.43142 | PLGA | 85/15 | ESTER | 0.55-0.75 | 65-95 |
| EXPANSORB ® DLG 85-12E | 5.45583 | PLGA | 85/15 | ESTER | 1.00-1.30 | 185-210 |
| EXPANSORB ® DLG 50-6P | 5.43143 | PLGA-PEG | 50/50 | PEG | 0.45-0.65 | 30-60 |
| EXPANSORB ® DLG 50-7P | 5.43144 | PLGA-PEG | 50/50 | PEG | 0.65-0.80 | 60-85 |
| EXPANSORB ® DLG 75-4A | 5.45223 | PLGA | 75/25 | COOH | 0.30-0.50 | 25-60 |

The biodegradable polymers used in the present invention preferably have a weight average molecular weight range (kDa) of 4-250, 4-240, 4-15, 5-210, 5-90, 5-20, 7-17, 10-25, 10-18, 10-15, 15-40, 15-30, 18-28, 24-38, 25-60, 30-70, 30-60, 35-60, 37-84, 42-65, 45-85, 50-95, 60-85, 65-95, 65-85, 70-100, 76-130, 76-116, 80-130, 80-115, 100-160, 110-166, 185-210, 190-240, more preferably 7-85, 8-16, 25-37, 0.45-0.80, 0.46-0.64, 0.66-0.79, most preferably 7-17, 24-38, 45-65 and/or 65-80. The biodegradable polymers used in the present invention preferably have a glass transition temperature of 42-48° C., more preferably 43-47° C. even more preferably 42-46 or 44-48° C. The biodegradable polymers used in the present invention preferably have an inherent (intrinsic) viscosity [dl/g](0.1% in CHCl$_3$ at 25° C.) of 0.03-1.70, 0.03-1.75, 0.05-1.60, 0.05-0.20, 0.06-1.60, 0.08-0.21, 0.13-1.32, 0.16-1.28, 0.12-0.46, 0.14-0.22, 0.14-1.70, 0.15-0.21, 0.15-0.25, 0.15-0.30, 0.15-0.43, 0.16-0.24, 0.18-0.22, 0.25-0.35, 0.25-0.35, 0.25-0.40, 0.25-0.50, 0.30-0.46, 0.30-0.50, 0.32-0.44, 0.35-0.42, 0.35-0.55, 0.38-0.64, 0.40-0.50, 0.40-0.55, 0.40-0.60, 0.42-0.67, 0.42-0.82, 0.45-0.60, 0.45-0.65, 0.47-0.63, 0.47-0.78, 0.50-0.65, 0.55-0.65, 0.55-0.75, 0.61-0.74, 0.60-0.70, 0.60-0.75, 0.60-0.80, 0.63-0.82, 0.65-0.80, 0.67-0.78, 0.66-0.80, 0.65-0.90, 0.70-0.90, 0.71-1.00, 0.75-1.00, 0.80-1.10, 0.80-1.20, 1.00-1.30, 1.30-1.70. Polymers terminated (capped) with ester, alkyl ester and/or PEG groups are preferred.

The biodegradable polymers used in the present invention are preferably PLGA copolymers (poly(D,L-lactide-co-glycolides)) having a L/G ratio of 5/95-95/5, 10/90-90/10, 15/85-85/15, 25/75-75/25, 35/65-65/35, 45/55-55/45, 45/55-50/50, 50/50-55/45, 55/45-65/35, 65/35-75/25, 75/25-85/15, 85/15-90/10, 90/10-95/5, more preferably 25/75, 45/55, 50/50, 55/45, 65/35, 75/25, 75/25, 85/15, 90/10, 95/5, 95/5, most preferably 50/50.

Preferred biodegradable polymers are PLGA copolymers having a L/G ratio of 25/75-75/25, preferably 35/65-65/35, more preferably 45/55-55/45, most preferably 50/50; and having a weight average molecular weight range (kDa) of 5-90, preferably 7-85, more preferably 7-17, 24-38, 30-60, 60-85, further preferably 8-18, 25-37, 31-59, 61-84; and having an inherent (intrinsic) viscosity [dl/g](0.1% in CHCl$_3$ at 25° C.) of 0.14-0.82, preferably 0.16-0.80, more preferably 0.16-0.24, 0.32-0.44, 0.45-0.65, 0.65-0.85, further preferably 0.17-0.23, 0.323-0.43, 0.46-0.64, 0.66-0.84; and being terminated with ester, alkyl ester and/or PEG groups; optionally having a glass transition temperature of 42-48° C., preferably 42-46 or 44-48° C., further preferably 43-45 or 45-47° C.

Preferred biodegradable polymers are poly(D,L-lactide-co-glycolides) with a PLA/PGA ratio of 50:50; preferably having a weight average molecular weight range of 7,000-38,000, more preferably 7,000-17,000 or 24,000-38,000; and/or an intrinsic viscosity of 0.16-0.44, more preferably 0.16-0.24 or 0.32-0.44; and/or a glass transition temperature of 42-48° C., more preferable 42-46 or 44-48 C. Further preferably, the biodegradable polymer is selected from Resomer® RG 502 ("Resomer 502"), Resomer® RG 503 ("Resomer 503") or a mixture thereof.

Preferred biodegradable polymers are also poly(D,L-lactide-co-glycolides) with a PLA/PGA ratio of 50:50 and a PEG end group (PLGA-PEG); preferably having a weight average molecular weight range of 30-85, more preferably 30-60 kDa; and/or preferably having an intrinsic viscosity of 0.45-0.80, more preferably 0.45-0.65. Further preferably, the biodegradable polymer is EXPANSORB® DLG 50-6P.

Methods for Manufacturing

The present invention further provides a method for manufacturing the complex as described above, the method comprising the following steps: (a) mixing a tetracycline compound (TC) or a pharmaceutically acceptable salt, hydrate or solvate thereof and a divalent metal carboxylate (MA$_2$) in a molar ratio of 1:0.8-3.0 with an organic solvent to obtain a dispersion, wherein the divalent metal cation M is an earth alkaline metal cation and A is a carboxylate anion derived from a C$_8$-C$_{24}$ carboxylic acid; (b) heating said dispersion to form the complex; (c) removing the solvent to obtain the complex. Preferable tetracycline compounds, molar ratios, carboxylate anions, pharmaceutically acceptable salts, hydrates and solvates are as described in the section "Complexes" above. In a preferred embodiment, the complex according to the present invention is obtained/obtainable by a method for manufacturing as described herein.

In the mixing step (a), a preferable solvent is, e.g., an alcohol, such as methanol, ethanol or mixtures thereof in the presence or in the absence of water. Preferably, a mass/volume ratio of TC to solvent of 1:100 to 1:300, preferably 1:200 may be used.

Heating the dispersion (b) accelerates the formation of the complex, preferably at a temperature of 50° C. or more, more preferably 60° C. or most preferably 70° C. or more and up to the boiling point of the solvent. Depending on the solvent chosen, the temperature and the mass/volume ratio of TC to solvent, complete dissolution may occur during step (b), such that a solution of the complex is obtained.

In step (c), the solvent can be removed by a suitable method known in the art. Preferably, the solvent may be evaporated at room temperature or elevated temperature; and/or in a shaker, an oven or on/in a film; and/or under atmospheric or preferably reduced pressure.

The pharmaceutical preparations according to the present invention, unless otherwise specified, may be prepared according to a suitable method known in the art. However, when the pharmaceutical preparations are in the form of strand-shaped extrudates, the latter are preferably prepared according to a method for comprising the following steps: (d) comminuting said complex and, if present, one or more pharmaceutically acceptable excipients to obtain an extrusion precursor; (e) extruding said extrusion precursor at a temperature above room temperature; (f) cooling the product of step (e) to obtain the pharmaceutical preparation in the form of a strand-shaped extrudate. preferred excipients, routes of administration and types of preparations, extrudates, and biodegradable polymers are as described in the section "Pharmaceutical Preparations" above. In a preferred embodiment, the pharmaceutical preparation according to the present invention is obtained/obtainable by a method for manufacturing as described herein.

In the comminution step (d), the complex is mixed, comminuted and homogenized together with one or more pharmaceutically acceptable excipient(s) (as described above, and if present) to obtain an extrusion precursor. Preferably, one or more biodegradable polymer(s), emulsifier(s) and/or plasticizer(s) as described above may be added as excipients. Further preferably, the content of the tetracycline compound (TC) added is in the range of 5-30 wt. %, more preferably 8-28 wt. %, further preferably 10-20 wt. %, yet further preferably 11-15 wt. %, and most preferably 11.5 wt. % or 27.9 wt. % relative to the total amount of components mixed. Comminution is preferably performed by milling or grinding, preferably in a mill or a grinder, more preferably at a low temperature, e.g., in a cryomill at −196° C. When a cryomill is used, performing 6, preferably 5 milling cycles at a frequency of 30 Hz for 150 s with intermediate cooling (30 s) at a frequency of 5 Hz between the cycles is particularly preferred to obtain an extrusion precursor.

The extrusion step (e) is performed by extruding the extrusion precursor through a die. Preferably, a twin-scree extruder may be used. The extrusion is performed at a suitable temperature above room temperature which is sufficient to ensure plastic deformability of the extrusion precursor material. Depending on the composition of the precursor, this is preferably a temperature about equal to or above the softening point (in the case of a pure complex without polymer ingredients); or to or above the glass transition temperature ((in the case where polymer ingredient, such as biodegradable polymers are present). Typically, the extrusion temperature may be preferably in the range of 48 to 56° C., more preferably from 49 to 55° C., even more preferably selected from 49, 52, 53 and 55° C.

The cross-sectional shape of the extrudate is mainly determined by the die at the exit of the extruder, which may be preferably essentially circular or an essentially elliptical cross section and/or a maximum cross-sectional diameter in the range of 0.1-10 mm, more preferably 0.2-5 mm, further preferably 0.3-1 mm, yet further preferably 0.4-0.8 mm, most preferably 0.6 mm. Greenstein and Tonetti (Greenstein, G. et al. *J Periodontol* 2000, 76, 1237-1247) demonstrated in their work the difficulties of the dental sulcus as targeted application site. The inflamed dental pocket is at least about 5 mm deep, 3 mm wide and 1 mm thick. The sulcus volume of 15 µl is renewed approximately 40 times per hour. This limited volume enables high local concentrations of the API. Hence, a diameter less than 1 mm and/or a length of less than 5 mm, preferably less than 3 mm, is preferred for a comfortable application. Preferable diameters of the extrudates are, e.g., 125-975 µm, 425-575 µm, 625-775 µm. Preferably, the extrusion step yields homogeneous extrudates with a diameter from 600 to 900 µm, e.g., 620-880 µm. The use of different diameters adapted to the pocket size and the simultaneous application of different diameters (e.g., 600 µm surrounded by 300 µm) seems highly promising. The diameter and shape of the extrudates can be adapted. For instance, the die of the extruder can be exchanged as desired by a plate with different diameters or geometric forms.

Upon cooling (f) of the extruded product of step (e), a pharmaceutical preparation in the form of a strand-shaped extrudate is obtained, as shown, e.g., in FIG. 9. The thus obtained strand-shaped may be further cut into smaller pieces or deformed as desired, e.g. in order to be adopted for placement into a periodontal pocket of a certain size or shape.

Therapeutic Applications

The present invention further provides a complex and/or a pharmaceutical preparation as defined above for use in a method for treatment of the human or animal body. The present disclosure also provides a method for treatment of the human or animal body wherein the method comprises administration of a therapeutically effective amount of a complex and/or a pharmaceutical preparation as defined above to a subject in need thereof.

The present invention further provides a complex and/or a pharmaceutical preparation as defined above for use in a method for therapy and/or prophylaxis of a bacterial infection, preferably caused by one or more bacteria selected from the group consisting of *Porphyromonas gingivalis, Prevotella intermedia, Tannerella forsythia, Streptococcus gordonii, Fusobacterium nucleatum, Actinomyces naeslundii* and *Parvimonas micra*; and/or wherein antibiotic activity is maintained over a period of at least 21 days, preferably at least 25, more preferably at least 28, further more preferably at least 35 days, most preferably 42 days; and/or for use in a method for therapy and/or prophylaxis of an acute, chronic or recurrent periodontal disease. The disclosure further provides a method for therapy and/or prophylaxis of a bacterial infection, preferably caused by one or more bacteria selected from the group consisting of *Porphyromonas gingivalis, Prevotella intermedia, Tannerella forsythia, Streptococcus gordonii, Fusobacterium nucleatum, Actinomyces naeslundii* and *Parvimonas micra*; and/or wherein antibiotic activity is maintained over a period of at least 21 days preferably at least 25, more preferably at least 28, further more preferably at least 35 days, most preferably 42 days; and/or a method for therapy and/or prophylaxis of an acute, chronic or recurrent periodontal disease, each comprising administration of a therapeutically effective amount of a complex and/or a pharmaceutical preparation as described above to a subject in need thereof, respectively.

It is currently considered that *P. gingivalis, P. intermedia, T. forsythia, F. nucleatum* and *P. micros* are pathogens particularly associated with periodontitis. Additionally, *A. naeslundii* and *S. gordonii*, belonging to the so-called "early colonizers", are considered to be essential for the formation of a biofilm (e.g., an oral periopathogenic biofilm) and are also present in the cases of periodontal diseases.

The major categories of periodontal diseases and conditions are classified in the groups of dental plaque-induced gingival diseases, chronic periodontitis, aggressive periodontitis, periodontitis as a manifestation of systemic diseases, necrotizing periodontal diseases, abscesses of the periodontium, periodontitis associated with endodontic lesions, peri-implant mucositis, peri-implantitis, and endodontic infections. In the present invention, the acute, chronic or recurrent periodontal disease is preferably selected from the group consisting of dental plaque-induced gingival diseases, periodontitis, chronic periodontitis, aggressive periodontitis, periodontitis as a manifestation of systemic diseases, necrotizing periodontal diseases, abscesses of the periodontium, periodontitis associated with endodontic lesions, peri-implant mucositis, peri-implantitis and endodontic infections. The present disclosure also provides a method for therapy or prophylaxis of an acute, chronic or recurrent periodontal disease which is preferably selected from the group consisting of dental plaque-induced gingival diseases, periodontitis, chronic periodontitis, aggressive periodontitis, periodontitis as a manifestation of systemic diseases, necrotizing periodontal diseases, abscesses of the periodontium, periodontitis associated with endodontic lesions, peri-implant mucositis, peri-implantitis and endodontic infections, wherein the method comprises administration of a therapeutically effective amount of a complex and/or a pharmaceutical preparation as described above to a subject in need thereof. Further acute, chronic or recurrent periodontal diseases are described, e.g., in Armitage, A. *Ann Periodontol* 1999, 4, 1-6.

The term "subject" as used herein refers to an animal, preferably a mammal, most preferably a human, who is or has been the object of treatment, therapy, prophylaxis, observation or experiment.

The term "therapeutically effective amount" as used herein means that amount of active compound or pharmaceutical agent that elicits the biological or medicinal response in a tissue system, animal or human being sought by a researcher, veterinarian, medical doctor or other clinician, which includes alleviation of the symptoms of the disease or disorder being treated.

EXAMPLES

Formation and Properties of Complexes

Example 1: Formation of a 1:2 Complex of Minocycline (Free Base) and Magnesium Stearate Minocycline (free base) was weight in a round-bottom flask together with magnesium stearate in a molar ratio of 1:2. Specifically, minocycline (10 mg, M=457.48 g/mol, 218.8 µmol) was combined with magnesium stearate (25.848 mg, M=591.24 g/mol, 43.717 µmol). Both components were briefly mixed in a hand-shaker. The mixture was suspended in undenatured ethanol (96% v/v, 2 mL) to afford a light yellow, non-translucent suspension. The closed flask was placed in a water bath under gentle swirling. Beginning at about 50° C., formation and dissolution of the complex started. At about 60-70° C., a clear, orange solution was formed which remained clear upon cooling to room temperature. The solvent was removed in a tempered shaker. FIG. 1 shows vials with the dried products.

Example 2: Formation of a 1:1 Complex of Minocycline (Free Base) and Magnesium Stearate A complex having a molar ratio of 1:1 was prepared in an analogous way as described in Example 1 by using an appropriately adapted amount of minocycline (free base).

Example 3: Formation of a 1:2 Complex of Minocycline Hydrochloride and Magnesium Stearate A complex of minocycline hydrochloride and magnesium stearate having a molar ratio of 1:2 was prepared in a similar manner as described in Example 1 above, wherein an appropriate amount of minocycline hydrochloride was used such that the molar ratio of minocycline and magnesium stearate was 1:2.

Example 4: Formation of a 1:1 Complex of Minocycline Hydrochloride and Magnesium Stearate A complex of minocycline hydrochloride and magnesium stearate having a molar ratio of 1:1 was prepared in a similar manner as described in Example 1 above, wherein an appropriate amount of minocycline hydrochloride was used such that the molar ratio of minocycline and magnesium stearate was 1:1.

Example 5: Formation of a 1:2 Complex of Doxycycline (Free Base) and Magnesium Stearate A complex of doxycycline (free base) and magnesium stearate having a molar ratio of 1:2 was prepared in a similar manner as described under Example 1 above, wherein doxycycline was used instead of minocycline.

Example 6: Formation of a 1:1 Complex of Doxycycline (Free Base) and Magnesium Stearate A complex of doxycycline (free base) and magnesium stearate having a molar ratio of 1:1 was prepared in a similar manner as described under Example 1 above, wherein however doxycycline free base was used instead of minocycline an appropriate amount of doxycycline was such that the molar ratio was 1:1.

The products from the above examples have different properties as compared to those of the respective tetracycline compounds (minocycline, minocycline hydrochloride and doxycycline), which is indicative for the formation of distinct, new complexes.

The solubility of the complexes as compared to the respective tetracycline compound (e.g., pure minocycline) is reduced. Minocycline is soluble in most polar solvents, such as water, dimethyl sulfoxide, ethanol, methanol and N-methyl pyrrolidone. The complexes, in contrast, are sparingly soluble in water but are well-soluble in chloroform. The stearate counter ion is considered to contribute to the modified solubility properties. Variations of the counter ion may be considered in order to tune the solubility.

Figure 2:
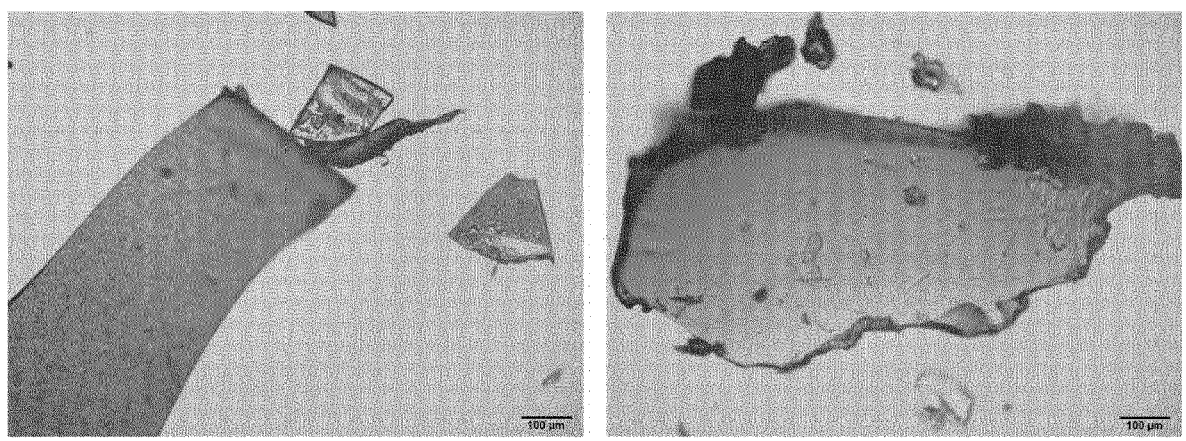
FIG. 2 shows microphotographs of dried minocycline/magnesium stearate having a molar ratio of minocycline/magnesium stearate of 1:1 (left, Example 2) and 1:2 (right, Example 1).
Figure 3:
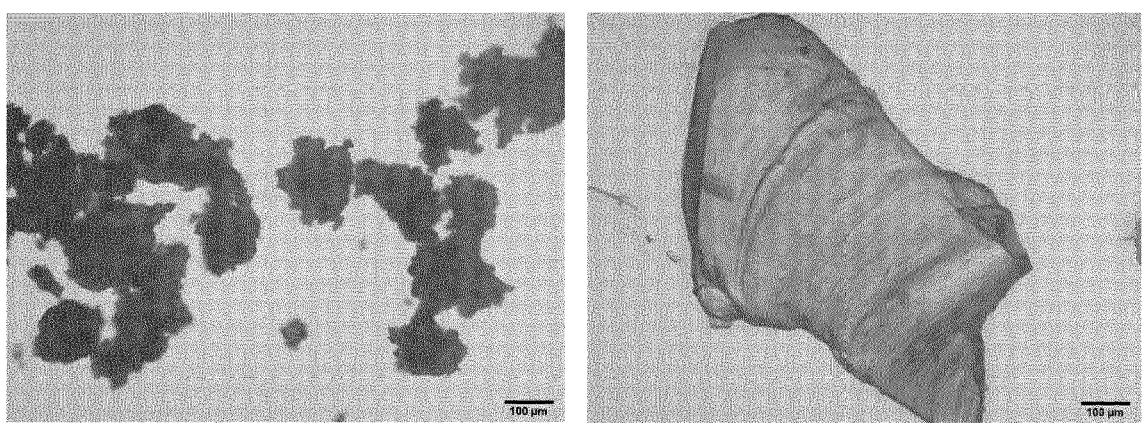
FIG. 3 shows microphotographs of dried doxycycline-magnesium stearate having a molar ratio of doxycycline/magnesium stearate of 1:1 (left, Example 6) and 1:2 (right, Example 5).

The products having a molar ratio of the tetracycline compound to magnesium stearate of 1:1 crystallize upon drying, whereas those having a molar ratio of 1:2 solidify to afford a glassy solid (FIG. 1). Samples were taken from these solids and studied under a microscope. In the solids having a molar ratio of 1:1, an inhomogeneous composition was observed (FIG. 2, left), whereas the samples having a molar ratio of 1:2 showed a uniform appearance (FIG. 2, right). Similarly, the solid obtained from doxycycline and magnesium stearate in a ratio of 1:1 afforded inhomogeneous agglomerates (FIG. 3, left), whereas a glassy structure was formed in case of a molar ratio of 1:2 (FIG. 3, right) extraction by means of a spatula.

Example 7: Stabilization in Aqueous Environment

Figure 4:
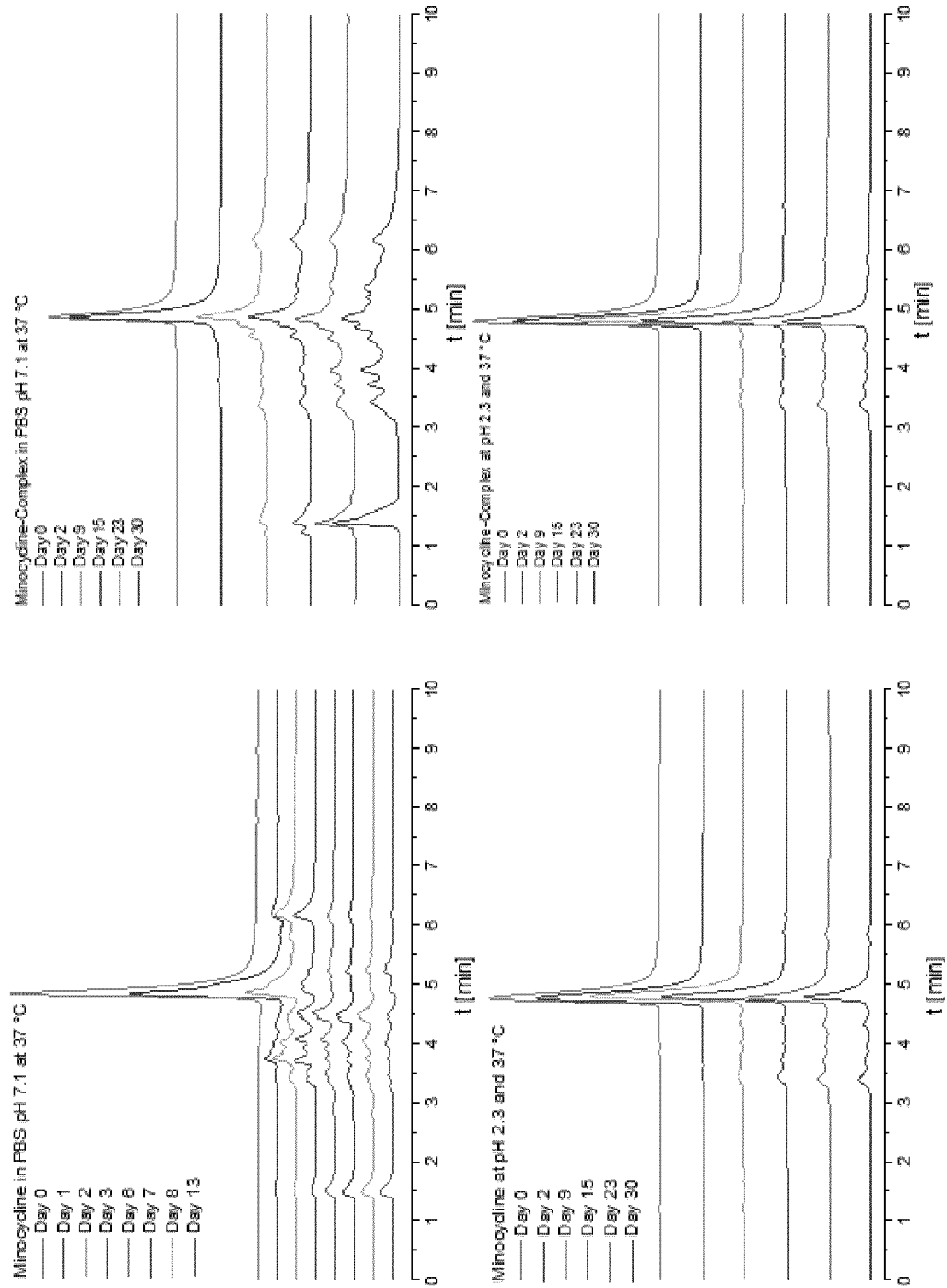
FIG. 4 shows chromatograms of minocycline (left) and the complex according to Example 1 (right) during incubation in a buffer at pH 7.1 (top) and 2.3 (bottom) at 37° C. over time (day zero always being the top curve).

Minocycline (10 mg; FIG. 4, left hand) and the complex of Example 1 (20 mg; FIG. 4, right-hand side) were placed in separate vials to provide an approximately equal amount of minocycline. Each sample was dispersed in 4 mL of the respective buffer (PBS) at pH 7.1 (FIG. 4, top row) or pH 2.3, (FIG. 4, bottom row). The samples with the complex resulted in a suspension due to the lower solubility of the complex. The samples were incubated at 37° C. over multiple days and spectra were recorded upon separation by means of HPLC with an UV detector at a wavelength of 355 nm. The dominant peak at retention time of 4.75 min corresponds to minocycline. In the neutral pH area at 37° C., a complete decomposition is observed after 3 days in the case of pure minocycline (FIG. 4, top left). Under acidic conditions, the decomposition process is slower, although minocycline nevertheless continuously decays to some extent. The complex, in turn, is less susceptible to decomposition because it is less soluble due to its lipophilic properties and reacts less intensively with the solvent (FIG. 4, right-hand side). It is considered that during incubation, further fractions of the complex are dissolved and only then exposed to decomposition. Although decay of the active substance is then observed as well, it is nevertheless much slower in the case of the complex, in particular under neutral conditions (FIG. 4, top right). Thus, the complexation is considered to provide stabilization towards the composition in aqueous environment.

Example 8: Spectroscopic Properties a) UV/Vis Absorption Spectra

Figure 5:
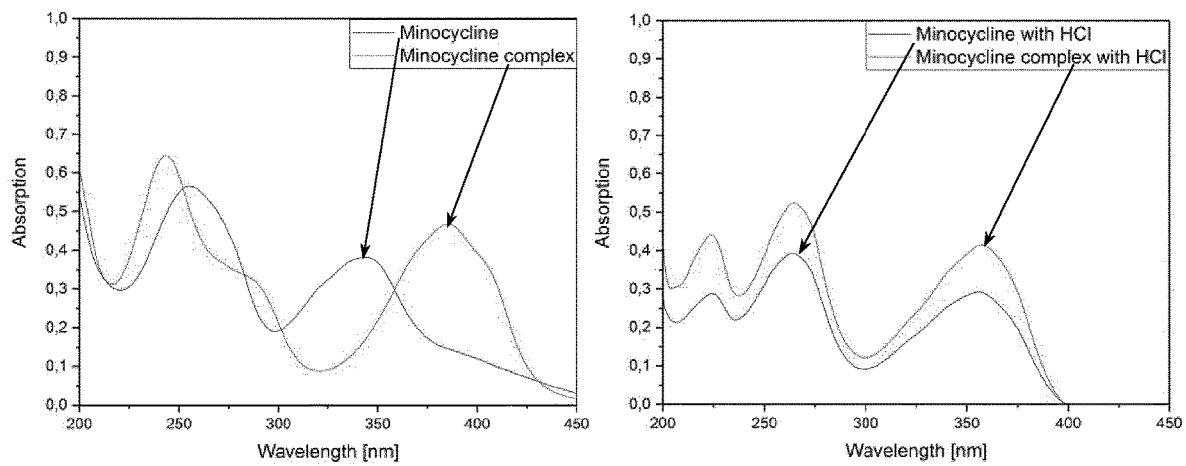
FIG. 5 shows UV/Vis absorption spectra of minocycline and the minocycline complex according to Example 1 in ethanol before (left) and after (right) addition of hydrochloric acid.

Furthermore, changes in the absorption spectra were observed (FIG. 5). Freshly prepared ethanol solution of minocycline and the complex of Example 1 were prepared at a concentration of 5 mg/mL of minocycline. From these stock solutions, 10 µL were taken and diluted with ethanol (3 mL) such that a final concentration of 16.6 µg/mL minocycline was obtained. The spectra measured by means of a Shimadzu UV-1800 spectrophotometer. Minocycline shows absorption maxima at 255 and 344 nm. Upon complexation, the first maximum is hypsochromically shifted to 244 nm, whereas the other maximum is bathochromically shifted to 385 nm. Upon addition of a small amount of hydrochloric acid, both maxima shift to 264 and 355 nm.

b) IR Absorption Spectra

Figure 6:
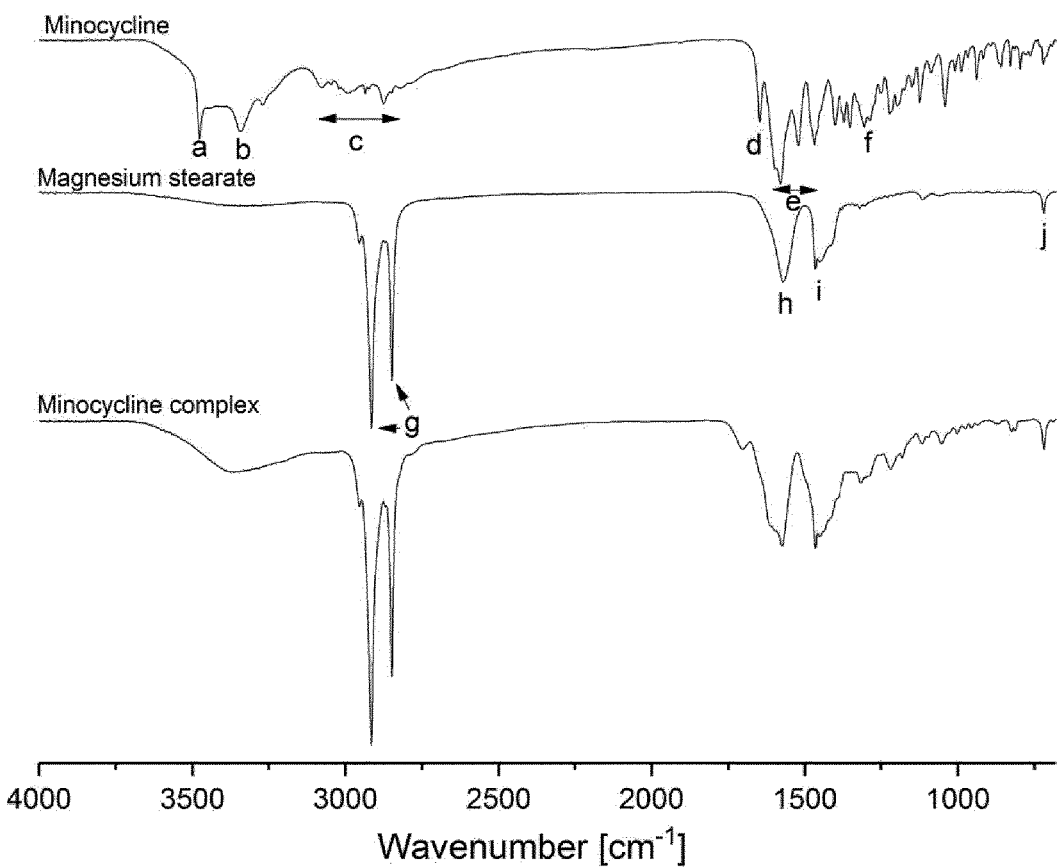
FIG. 6 shows FTIR-ATR spectra of minocycline, magnesium stearate and the complex according to Example 1 in the area 680-4000 $cm^{-1}$.

FTIR-ATR spectra were measured in potassium bromide pellets using a Bruker IFS 28 instrument equipped with a Sensir ATR unit in the area of 4000 to 400 cm$^{-1}$. The IR spectra as well provide indications for the complexation (FIG. 6; minocycline: a—ν O—H; b—ν N—H; c—ν C—H; d—ν C=O/CONH$_2$; e—ν C=C (aromatic); f—ν C—N; Magnesium stearate: g—ν C—H; h—ν$_{as}$ COO$^-$; i—δ C—H; j—CH$_2$ rocking-vibration). The peaks at 3478 cm$^{-1}$ of pure minocycline can be attributed to the vibration of the hydroxy group forming intramolecular hydrogen bonds. In contrast, the complex shows a broad peak at the same position. Due to the fact that this group forms a part of the coordination site for chelate formation, hindrance of the free vibration of the hydroxy groups and thus smoothening of the peak is observed upon complexation. Furthermore, the C—H-vibrations of minocycline are overshadowed by the intense C—H-vibrations of magnesium stearate. The carboxylate peak at 1570 cm$^{-1}$ remains recognizable. The newly arising peak at 1700 cm$^{-1}$ cannot be directly attributed to a functional group. The fingerprint area is also modified due to the overlapping vibrations.

Formation and Properties of Pharmaceutical Preparations (Extrudates)

Example 9: Extrusion of a 1:2 Complex of Minocycline (Free Base) and Magnesium Stearate a) Complex Preparation For extrusion, typically a larger amount of the complexes is required (e.g., an amount corresponding to 100 mg minocycline or more). The components were weighed and treated as described above under Example 1. Subsequently, the complex solution was spread onto multiple Petri dishes coated with Teflon film, and was covered with perforated aluminum foil. The Petri dishes were dried in a vacuum dying oven at room temperature over at least 8 hours (or overnight). A yellow powder was obtained, which was then removed from the Teflon film by means of a card sheet.

b) Extrusion Precursor Preparation

Then, comminution and homogenization was performed by means of a Retsch CryoMill. The complex powder (1.00 g, corresponding to 289 mg of pure minocycline) was weighed in the cryomill jar together with two milling balls of 1 cm size in the cryomill jar. The jar was fitted into the cryomill and the following parameters were adjusted: upon automatic precooling phase, 6 milling cycles at a frequency of 30 Hz for 150 s each were performed: between the individual milling cycles, intermediate cooling (30 s) was performed at a frequency of 5 Hz. Upon thawing up to room temperature, the extrusion precursor was obtained.

c) Extrusion

For extrusion, the three heating zones of a twin-screw extruder were pre-heated at H1=49° C., H2=52° C. and H3=55° C. The control unit of the twin-screw extruder was set to 800 rpm, which corresponds to an actual rotation frequency of estimated 150 turns of the screws per minute. The extrusion precursor was carefully added to the extruder by hand and in small portions. Upon sufficient filling and after the required amount of time, the material reached the softening point and was capable of being deformed plastically. The complex exited the extruder through a 0.6 mm wide die plate as a continuous strand and was captured on a Teflon film coated surface, where it was cooled down to room temperature to afford the final extrudate.

Example 10: Extrusion of a 1:2 Complex of Minocycline (Free Base) and Magnesium Stearate Together with Resomer 502 a) Complex Preparation

The components for the complex formation were weighed and treated as described above under Example 1. Subsequently, the complex solution was spread onto multiple Petri dishes coated with Teflon film, and was covered with perforated aluminum foil. The Petri dishes were dried in a vacuum dying oven at room temperature over at least 8 hours (or overnight). A yellow powder was obtained, which was then removed from the Teflon film by means of a card sheet.

b) Extrusion Precursor Preparation

Then, comminution and homogenization was performed by means of a Retsch CryoMill. The complex powder (412.3 mg, corresponding to 115 mg of pure minocycline) was weighed in the cryomill chamber together with 587.7 mg of the desired biodegradable polymer (Resomer 502) and two milling balls of 1 cm size in the cryomill jar. The jar was fitted in the cryomill and the following parameters were adjusted: upon automatic precooling phase, 6 milling cycles at a frequency of 30 Hz for 150 s each were performed; between the individual milling cycles, intermediate cooling (30 s) was performed at a frequency of 5 Hz. Upon thawing up to room temperature, the extrusion precursor was obtained (1 g, containing 11.5 wt. % pure minocycline).

c) Extrusion

For extrusion, the three heating zones of a twin-screw extruder were pre-heated at H1=49° C., H2=49° C. and H3=53° C. The control unit of the twin-screw extruder was set to 800 rpm, which corresponds to an actual rotation frequency of estimated 150 turns of the screws per minute. The extrusion precursor was carefully added by hand in small portions to the extruded. Upon sufficient filling and after the required amount of time, the material reached the glass transition temperature and was capable of being deformed plastically. The mixture exited the extruder through a 0.6 mm wide die plate as a continuous strand and was captured on a Teflon film coated surface, where it was cooled down to room temperature to afford the final extrudate. The obtained extrudate is shown in FIG. 9 (top).

Example 11: Extrusion of a 1:2 Complex of Minocycline (Free Base) and Magnesium Stearate Together with Resomer 503

An extrudate containing the 1:2 complex of minocycline (free base) and magnesium stearate from Example 1 together with Resomer 503 was prepared in analogous manner as described in Example 10, wherein Resomer 503 was used instead of Resomer 502. The obtained extrudate is shown in FIG. 9 (bottom).

Example 12: Extrusion of a 1:2 Complex of Minocycline (Free Base) and Magnesium Stearate Together with Resomer 502/503 (1:1) and 10% Glycerol Monostearate (GMS)

An extrudate was prepared in analogous manner as described in Example 10, wherein additionally glycerol monostearate (10 wt. % based on the total weight of the mixture) were used, and a mixture of Resomer 502 and Resomer 503 (1:1 w/w) in total amount adding up to 100 wt. % was used instead of Resomer 502.

Example 13: Extrusion of a 1:2 Complex of Minocycline (Free Base) and Magnesium Stearate Together with PEG-PLGA (Expansorb DLG 50-6P) and 10% PEG 1500

The complex powder prepared as described above under Examples 1 and 9 (412.3 mg, corresponding to 115 mg of pure minocycline and 297.3 mg magnesium stearate) was weighed in a Retsch CryoMill chamber together with the desired biodegradable polymer (Expansorb DLG 50-6P, 487.7 mg), plasticizer (PEG 1500, 100 mg) and two milling balls of 1 cm size. Then, comminution and homogenization was performed. The container was fitted in the cryomill and the following parameters were adjusted: upon automatic precooling phase, 5 milling cycles at a frequency of 30 Hz for 150 s each were performed; between the individual milling cycles, intermediate cooling (30 s) was performed at a frequency of 5 Hz. Upon thawing up to room temperature, the extrusion precursor was obtained (1 g, containing 11.5 wt. % pure minocycline).

Extrusion was performed in an analogous manner as described in Example 10.

Example 14: Release Properties of the Extrudates

Figure 7:
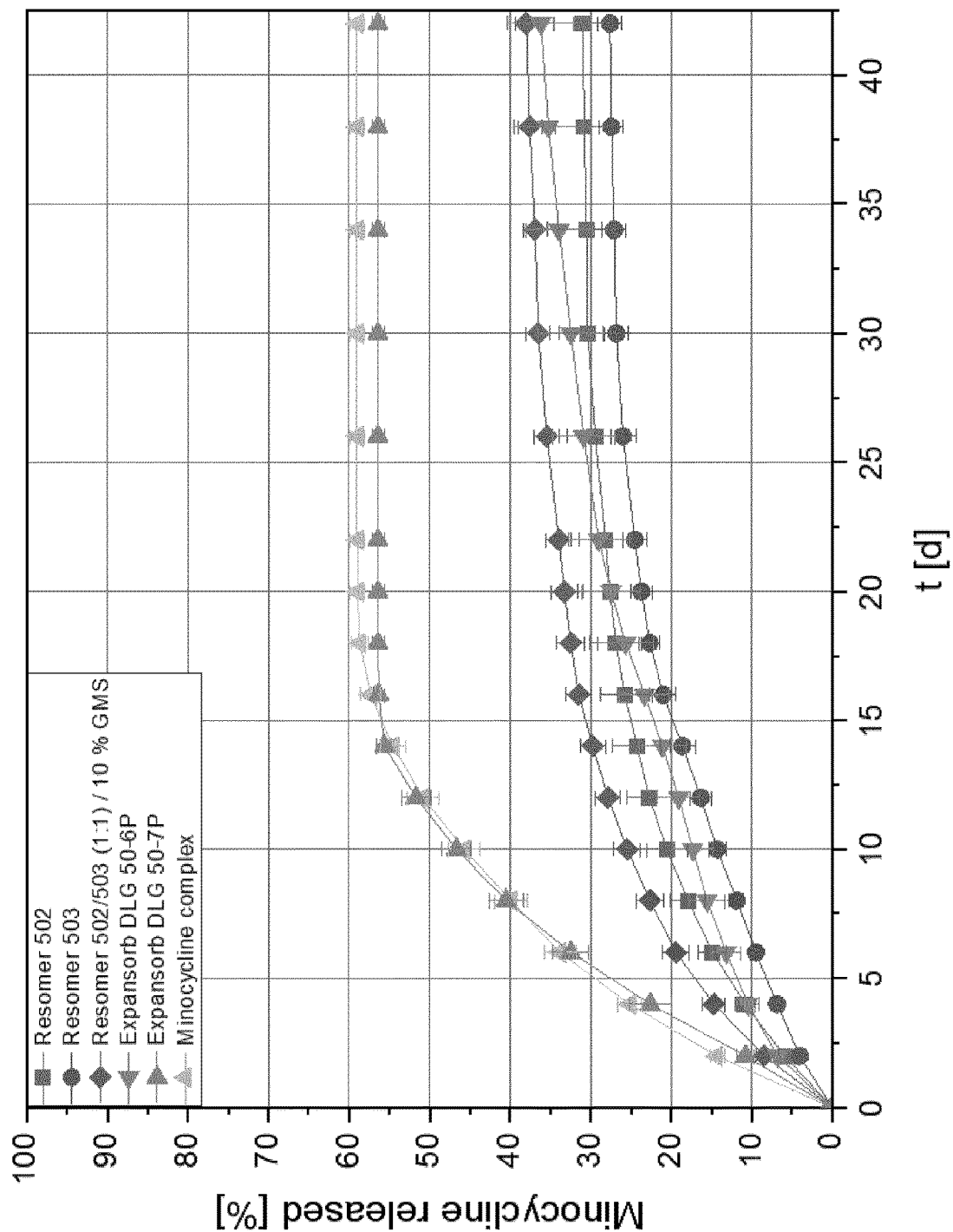
FIG. 7 shows release curves for the extrudate of Example 9 consisting of the pure minocycline/magnesium stearate complex 1:2, as well as together with various PLGA polymers upon extrusion (Examples 10-13).

FIG. 7 clearly shows the contribution of the complexes according to the invention to the delayed release of minocycline. Extrudates obtained by melt extrusion as described in Examples 9-13 were cut into 4 mm long pieces and incubated in 1 mL of buffer at pH 7.0 and 37° C. The extrudates of Examples 11-13 have a minocycline content of 11.5%; the pure complex extrudate of Example 9 has a minocycline content of 27.89%. Each time a sample was drawn from the incubation solutions, the entire buffer was exchanged and the minocycline content in the old buffer was determined by means of HPLC. As can be seen from FIG. 7, the pure complex extrudate of Example 9 shows a delayed release of up to almost three weeks. At the end of the experiment, the amount of minocycline remaining residuals in the extrudate of Example 9 was analyzed and it was shown that no active substance was present any more. It can be considered that the remaining 40% have decomposed over the time.

As can be seen from the curves for Examples 10-12, the addition of PLGA polymers leads to further release delay. In this case, about 10-13% of remaining minocycline were still present at the end of the experiment. This may be partially attributed to the acidic microenvironment in PLGA polymers and the slightly better stability in acidic medium, as demonstrated in FIG. 4.

Furthermore, the addition of an excipient such as glycerol mono stearate (Example 12) can accelerate the release if desired.

Finally, the PEG-PLGA-based extrudate of Example 13 containing Expansorb DLG50-6P and 10% of PEG 1500 as a plasticizer also shows advantageous sustained release properties. Additionally, this extrudate has an optimized flexibility and mechanical formability.

Example 15: Further Properties of the Extrudates a) Mechanical Properties

Figure 8:
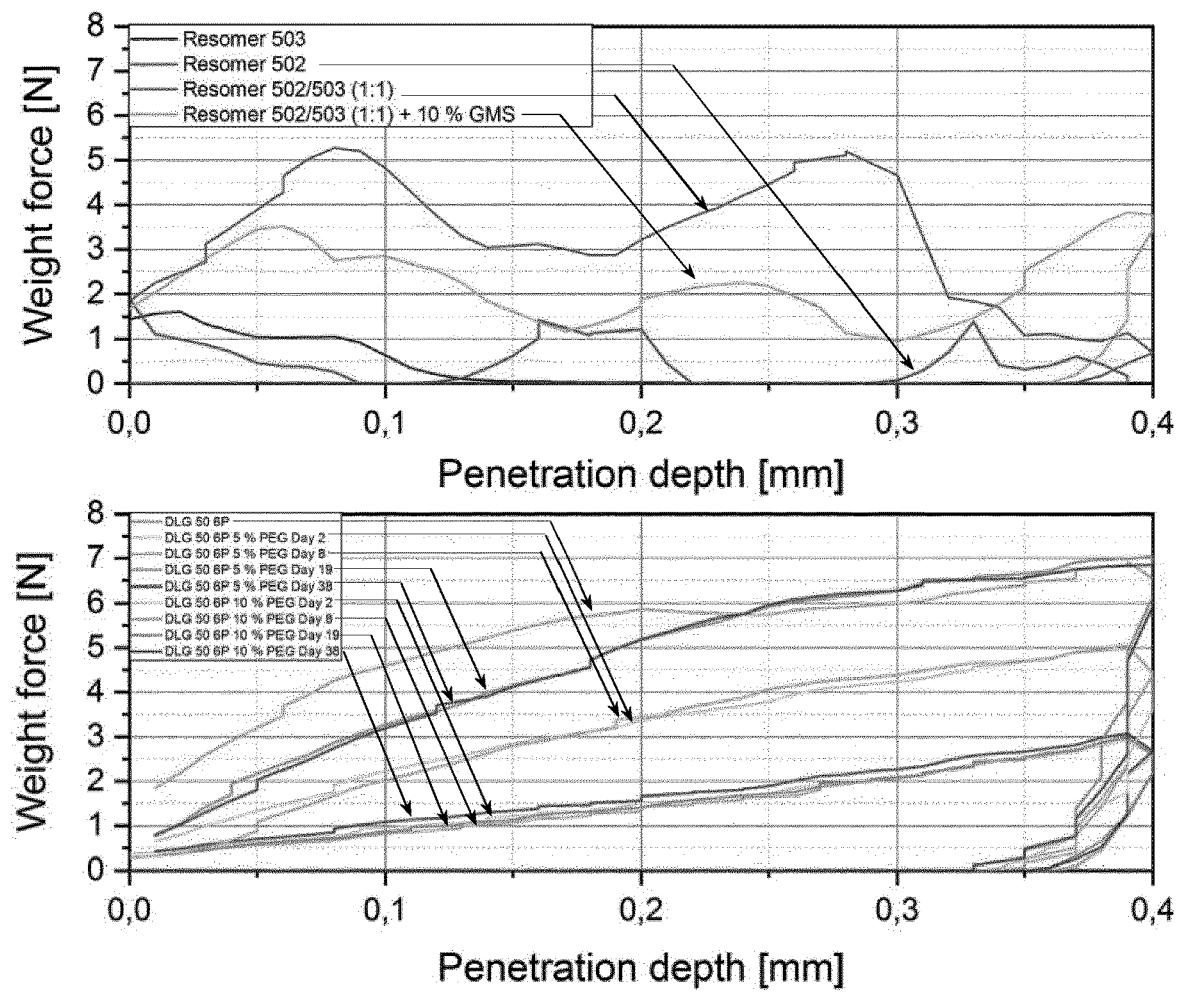
FIG. 8 shows force-displacement diagrams upon deformation of extrudates on a texture analyzer fitted with a knife edge blade.

FIG. 8 shows force-displacement diagrams upon deformation of extrudates fitted in a knife edge blade geometry. For these experiments, the extrudates were installed on a slide on a Brookfield CT3 texture analyzer equipped with a knife edge blade unit and the necessary weight force required for a predetermined penetration depth of 0.5 mm at a velocity of 0.02 mm/sec. was determined. The upper diagram shows brittle properties or extrudates containing Resomer 502, 503 and their mixture with and without glycerol monostearate. PEG-PLGA extrudates with different Expansorbs (lower diagram) show an almost linear relationship between penetration depth and necessary force. The absence of a force drops indicates an irreversible deformation which can be considered to be plastic. Macroscopically, the extrudates exhibit excellent flexibility. The composition with 10% PEG 1500 (Example 13) exhibits no change with respect to the mechanical properties even upon prolonged storage in a refrigerator. In contrast, the composition with 5% PEG hardens partially during storage and behaves rather like the corresponding extrudate without addition of a PEG.

b) Mucoadhesive Properties

Figure 10:
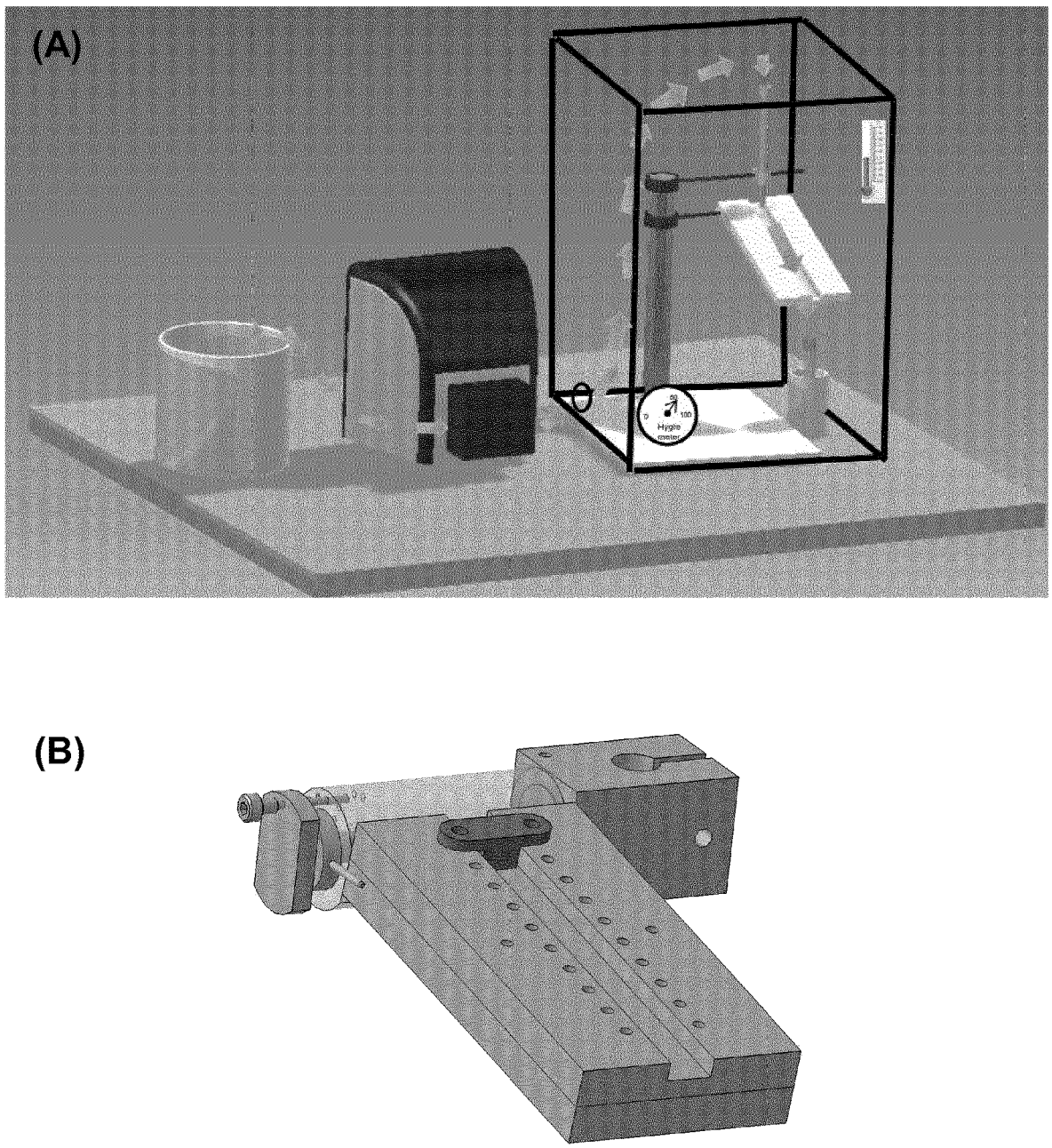
FIG. 10 shows an experimental assembly for assessment of the adhesive force towards mucous membranes (A) and the geometry of the flow channel specifically used for the measurements (B).

The retention ability of extrudate preparations was tested in a retention analysis experimental setup as shown in FIG. 10A. Porcine intestine mucosa obtained from Tönnies Lebensmittel GmbH & Co. KG (washed, portioned, packaged and frozen or used immediately) was used as a model surface fixed in the channel shown in FIG. 10B. Upon application of a continuous flow of deionized water at a predetermined washing rate (preferably, 300 μL/min) and for a predetermined time, the fraction of the tested preparation still retained by the test surface (mucosa) was determined in a manner similar to the method proposed by Batchelor et al. (*Int. J. Pharm.* 2002, May 15; 238(1-2):123-32). Preparations according to the present invention were found to exhibit good bioadhesion Release Kinetics and Antimicrobial Activity Example 16: Release Kinetics and Antimicrobial Activity (Minocycline Preparations)

In order to assess the release kinetics and biological activity of the active substances, an approach was chosen taking into consideration the conditions in the oral cavity, namely the flow rate (turnover) and composition of the sulcus in the gingival crevicular fluid (as described in Goodson, J M (2003), *Periodontol* 2000 31:43-54; Tew, J G et al. (1985), *Infect Immun* 49:487-93).

a) Release Kinetics

Figure 11:
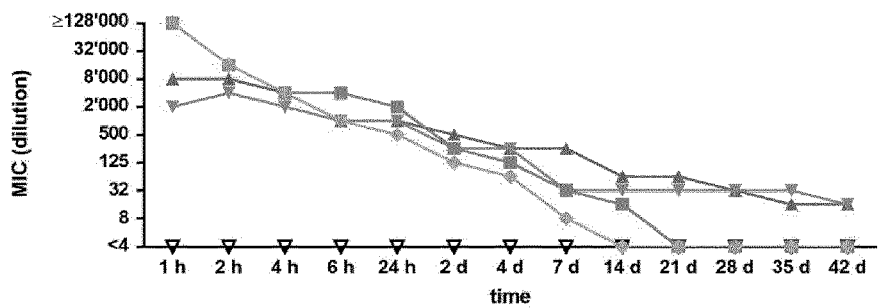
FIG. 11 shows the minimal inhibitory concentrations of eluates (dilutions) vs. *Streptococcus gordonii* ATCC 10558 and *Porphyromonas gingivalis* ATCC 33277 up to 42 days.
Figure 11:
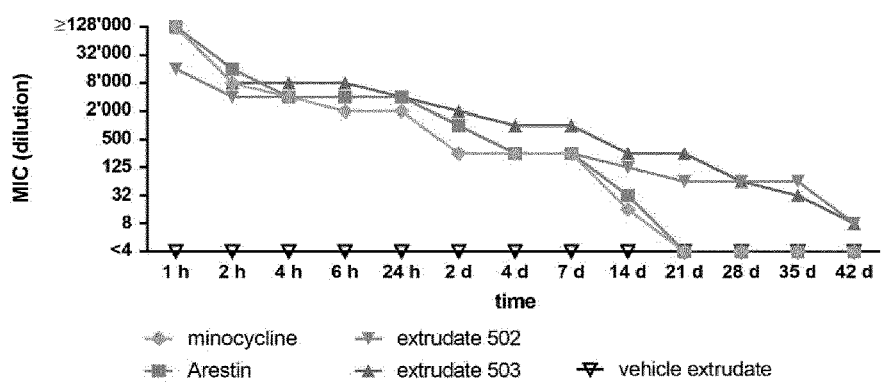

Specifically, samples of the following substances were tested, each containing an amount of active substance equivalent to 1 mg minocycline (except the vehicle extrudate):

minocycline hydrochloride powder (purchased from SIGMA, Product No. M9511-25MG; in FIG. 11/12: "minocycline")

minocycline/PLGA microspheres (Arestin® from Orapharma Inc. Europe, PZN 1295115; 1 capsule=1 mg minocycline; in FIG. 11/12: "Arestin")

Example 11 (in FIG. 11/12: "extrudate 503")

Example 10 (in FIG. 11/12: "extrudate 502")

control consisting of biodegradable polymer without tetracycline compound (in FIG. 11/12: "vehicle extrudate").

Samples were placed in dark tubes and an appropriate amount of buffered saline containing serum albumin (phosphate buffered saline with 15 mg/mL BSA) was added. At given time intervals, the samples were centrifuged, a predetermined amount of the buffer was removed and stored (eluate), and a fresh portion of buffer was then added. Eluates were collected over the course of seven weeks, as shown in Table 4, and tested with respect to their antimicrobial activity using the methods described below (minimal inhibitory concentration determination and biofilm formation inhibition).

TABLE 4

Pipetting chart for eluate samples drawn for release kinetics evaluation:

| Time | Removal (μL) | Addition (μL) |
| --- | --- | --- |
| 0 | 23.5 | |
| 30 min | 22 | 22 |
| 60 min* | 22 | 44 |
| 2 h* | 44 | 44 |
| 3 h | 44 | 44 |
| 4 h* | 44 | 88 |
| 6 h* | 44 | 792 |
| 24 h* # | 792 | 1'056 |
| 2 d* # | 1'056 | 1'056 |
| 3 d | 1'056 | 1'056 |
| 4 d* | 1'056 | 1'056 × 3 = 3'168 |
| 7 d* # | 3'168 | 3'500 |
| 10.5 d | 3'500 | 3'500 |
| 14 d* # | 3'500 | 3'304 |
| 17.5 d | 3'304 | 3'304 |
| 21 d* | 3'304 | 3'108 |
| 24.5 d | 3'108 | 3'108 |
| 28 d* # | 3'108 | 2'912 |
| 31.5 d | 2'912 | 2'912 |
| 35 d* | 2'912 | 2'716 |
| 38.5 d | 2'716 | 2'716 |
| 42 d* | 2'716 | 2'520 |
| 45.5 d | 2'520 | 2'520 |
| 49 d* | 2'520 | 2'324 |
| 52.5 d | 2'324 | 2'324 |
| 56 d* | 2'324 | |

*denotes eluates removed at these times were used in the MIC determination;
# denotes eluates removed at these times were used in the biofilm formation inhibition.

TABLE 5

Effective concentration of minocycline versus *Streptococcus gordonii* ATCC 10558 and *Porphyromonas gingivalis* ATCC 33277 up to 42 d, calculated based on the MIC of the eluates (dilutions)

| | Minocycline | | Arestin | | Extrudate 502 | | Extrudate 503 | |
| --- | --- | --- | --- | --- | --- | --- | --- | --- |
| | S. gord. | P. ging. | S. gord. | P. ging. | S. gord. | P. ging. | S. gord. | P. ging. |
| 1 h | >16000 | >32000 | >16000 | >32000 | 1000 | 4000 | 4000 | >32000 |
| 2 h | 8000 | 2000 | 8000 | 4000 | 2000 | 1000 | 4000 | 2000 |
| 4 h | 2000 | 1000 | 2000 | 1000 | 1000 | 1000 | 2000 | 2000 |
| 24 h | 250 | 500 | 1000 | 1000 | 500 | 1000 | 500 | 1000 |
| 2 d | 62.5 | 62.5 | 125 | 250 | 125 | 250 | 250 | 500 |
| 7 d | 4 | 62.5 | 15.6 | 62.5 | 15.6 | 62.5 | 125 | 250 |
| 14 d | <2 | 4 | 8 | 8 | 15.6 | 31.3 | 31.3 | 62.5 |
| 21 d | <2 | <1 | <2 | <1 | 15.6 | 15.6 | 31.3 | 62.5 |
| 28 d | <2 | <1 | <2 | <1 | 15.6 | 15.6 | 15.6 | 15.6 |
| 35 d | <2 | <1 | <2 | <1 | 15.6 | 15.6 | 8 | 8 |
| 42 d | <2 | <1 | <2 | <1 | 8 | 2 | 8 | 2 | b) Minimal Inhibitory Concentration (MIC) Determination

The dilutions were determined at which growth of two indicator strains (*Porphyromonas gingivalis* ATCC 33277, *Streptococcus gordonii* ATCC 10558) was still inhibited (minimal inhibitory concentration, MIC). For this purpose, samples the eluates were mixed with nutrition medium and the respective bacterial strain and incubated over 18 h at 37° C. under aerobic conditions. The approach and the media used were in accordance with the recommendations of The European Committee on Antimicrobial Susceptibility Testing—EUCAST. Each determination was performed double; growth control was performed each time in one well, respectively.

FIG. 11 shows at which dilution degree growth inhibition can still be observed (i.e. the minimal inhibitory concentrations of the eluates (dilution) versus *S. gordonii* ATCC 10558 and *P. gingivalis* ATCC 33277 up to 42 d). An activity of pure minocycline and the commercial product (Arestin) was present up to 21 d, whereas extrudate preparations 502 and 503 showed activity until the end of the observation (42 d).

In Table 5, based on the MIC for minocycline against the two strains (*P. gingivalis* ATCC 33277: 0.25 µg/mL, *S. gordonii* ATCC 10558: 0.5 µg/mL), the effective concentration of the active substance was calculated. These data also highlight the activity of the eluates over a prolonged period of time.

c) Biofilm Formation Inhibition

The surface of a 96-well plate was coated with 10 µL of eluate. Upon addition of a 6-species mixture of periodontitis-associated bacteria, a biofilm was formed over 6 h (as described in, e.g., Jurczyk K., Nietzsche S., Ender C., Sculean A., Eick S. In-vitro activity of sodium-hypochlorite gel on bacteria associated with periodontitis. *Clin Oral Investig.* 2016 November; 20(8):2165-2173). Then, the number of still vital bacteria in the biofilm (colony forming units=cfu) was determined.

Figure 12:
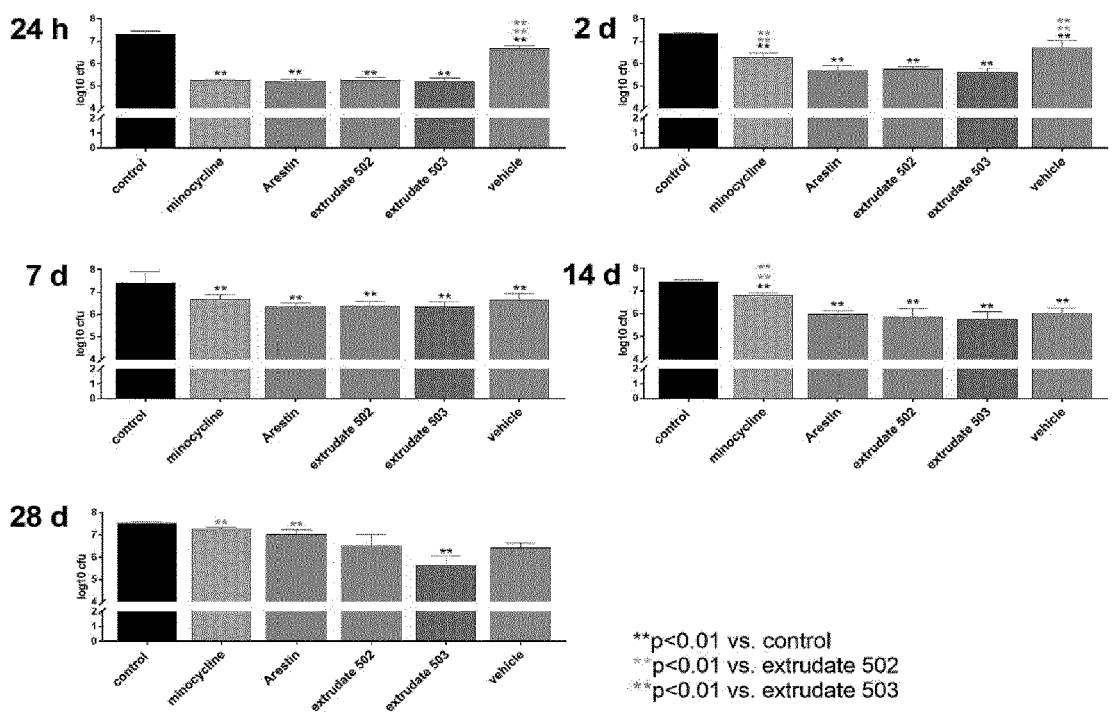
FIG. 12 shows the inhibitory effect of eluates obtained after 24 hours, 2 days, 7 days, 14 days and 28 days vs. biofilm formation.

FIG. 12 shows the inhibitory activity of eluates obtained after 24 h, 2 d, 7 d, 14 d und 28 d against biofilm formation. Biofilm formation inhibition can be attributed to antimicrobial activity, on the one hand, and to interference with steps of biofilm formation (attachment of microorganisms to surfaces or to already attached microorganisms (co-aggregation), matrix formation), on the other hand. Here, the eluate from the vehicle seems to show some anti-biofilm properties as well. After 24 h of incubation, no difference was present between the tested substances. Later on, however, all of the preparations according to the present invention show better activity than pure minocycline. After 28 days, a significant inhibition with Extrudate 503 ($-1.9 \log_{10}$ cfu) was still present.

Example 17: Release Kinetics and Antimicrobial Activity (Doxycycline Preparations)

In order to assess the release and kinetics and the biological activity of the doxycycline preparations, an analogous approach was chosen. Specifically, samples of the following substances were tested, each containing an amount of active substance equivalent to 1 mg doxycycline (except the vehicle extrudate):

doxycycline hyclate (1.15 mg doxycycline hyclate=1 mg doxycycline)

doxycycline gel (Ligosan®, 1 cartridge=260 mg, 14% doxycycline)

doxycycline extrudate (corresponding to 11.5% doxycycline, prepared in an analogous manner as described in Example 13)

vehicle extrudate.

The tests were performed in an analogous manner as described in Example 16 above. The release kinetics and antimicrobial activity of the preparation according to the present invention relative to the reference samples were found to be comparable with the results obtained for minocycline preparations.

FURTHER EXAMPLES

As potential complexing agents, we selected magnesium stearate and calcium stearate because of their high theoretical potential, their low toxicity, biodegradability and their broad use in drug delivery applications. The drug complex formation was followed by UV/VIS- and IR-spectroscopy. In addition, we wanted to study the impact of glycerol-monostearate in order to modify the release rate and the mechanical properties.

The complex formation might also negatively impact the activity of the drug. Hence, bioactivity measurements were carried out. Finally, in vitro release experiments were performed to evaluate the impact on the formulation on the release kinetics.

A. Materials and Methods

Minocycline and Doxycycline were purchased from Ontario Chemicals Inc. (Ontario, Canada). Magnesium stearate and calcium stearate were kindly provided by Magnesia Germany (Mullheim, Germany). PLGA polymers and Tegin® 4100 pellets (Glycerolmonostearate abbreviated as GMS) were a gift from Evonik (Darmstadt, Germany). Nile red was acquired from Sigma Aldrich (Munich, Germany). *Staphylococcus aureus* ATCC 29213 was used for screening of antimicrobial activity. All used solvents were acquired from Sigma Aldrich and at least of purissimum grade.

I. Chelation of the Tetracycline Derivates

The formation of a lipophilic drug complex was proposed as a potential method to increase the drug stability and to extend the release time. For this purpose, different molar compositions of the antibiotics and magnesium- or respectively calcium stearate were investigated. For the complex formation tetracyclines and the stearate salts were weighed into flasks, in a molar ratio of 1:1, 1:2 and 2:1. For instance, 10 mg of minocycline were paired with 25.48 mg of magnesium stearate (Molar ratio 1:2). 2 ml of ethanol were added to each flask, resulting in yellow suspensions. The flasks were heated in a water bath at 70° C. for 2 minutes.

II. Methods Used for Complex Characterization

To prove the existence of the minocycline complex, investigations of the chelates were necessary. Therefore, absorption spectra of the pure tetracycline derivatives and their complex solutions were examined with a Shimadzu UV-1800 spectrophotometer (Shimadzu, Duisburg, Germany). Beforehand, 10 µl of the freshly prepared 5 mg/ml stock solutions were diluted with 3 ml ethanol, and absorption spectra were taken in the range from 250 to 450 nm in a quartz cuvette. For the recording of the infrared (IR) spectra, homogeneous compacts of the API and zinc selenide were produced. Subsequently, this compacts were surveyed with a Bruker IFS 28 equipped with a Sensir ATR unit (Bruker, Billerica, United States) operating from 4000 to 680 $cm^{-1}$. Additionally, the solutions were dried in a rotary evaporator, and the remains were scraped from the flask. These remains were surveyed under a microscope (Carl Zeiss Microscopy, Jena, Germany). These remnants were also exposed to different solvents, to reveal changes in solubility.

III. Disc Diffusion Test

After deciding for minocycline as favored active component, an agar disc diffusion test was performed, to examine its antimicrobial activity after complexation. The procedure followed the recommendations set by EUCAST.

Test substance was the minocycline complex containing 10 mg/ml minocycline and controls were minocycline dissolved in ethanol (10 mg/ml), and pure ethanol. Solutions were diluted 3:7 with ethanol and immediately thereafter each 10 µl were pipetted to unloaded antibiotic test discs with a diameter of 6 mm (BD, Allschwil, Switzerland), thus each discs (except for ethanol control) contained 30 µg of minocycline. Overnight culture of S. aureus ATCC 29213 was suspended to McFarland 0.5, each 100 µl was spread on Mueller-Hinton-agar plate (Oxoid, Basingstoke, GB). Following the evaporation of the solvent, the test discs were placed on the plates. After incubation at 35° C. for 18 h, the diameters of the inhibition zones were measured.

IV. Extrusion Precursor Production with Cryomilling and Hot-Melt Extrusion

In advance of the cryomilling, an ethanolic minocycline complex solution was spread on Teflon foil covered petri dishes in a thin layer of droplets. The petri dishes were stored in a vacuum drying oven for at least 12 hours at 25° C. The dried minocycline complex powder was then collected from the Teflon foil.

Batch sizes of around 1 g are necessary to achieve a sufficient filling of the extrusion chamber. Hence, for cryomilling, 412.3 mg of minocycline complex powder (containing 115 mg minocycline) and 587.7 mg of the desired PLGA polymer were inserted into the grinding chamber together with two 10 mm steel spheres. The extrudates containing 10% GMS, therefore enclosed only 487.7 mg of PLGA polymer. After proper adjustment in the Retsch CryoMill (Retsch, Haan, Germany), the mixture was submitted to an automatic pre-cooling phase, followed by 5 milling cycles at 30 Hz for 150 s. After each milling cycle a 30 s long cooling phase reassured suitable process temperatures at 5 Hz.

Subsequently, the mixture was ready for extrusion. Therefore, a twin-screw extruder ZE 5 Eco (Three-Tec, Seon, Switzerland) with an integrated SK 500 E frequency converter was utilized. A die with a 600 µm diameter and screws with L/D-ratio of 21.25 were used. The extrusion temperature depended on the polymer and the intended diameter. Starting at 49° C. in the first heating zone, the temperature was progressively elevated up to 53° C. in the third heating zone for Resomer 502, 503 and their mixture. For the extrudates containing 10% GMS, 55° C. were applied in the last heating zone. The minocycline-PLGA powder was slowly and manually filled into the extruders opening at 800 rpm according to the frequency converter. The emerging continuous polymer string was captured on a Teflon foil covered surface. The final product was cut into pieces of desired length with a scalpel.

V. Determination of Drug Content

The minocycline content of the extrudates was quantified via a HPLC method after extraction of the drug from the extrudate. For the extraction a method inspired by A. Holmkvist et al. 2016 (24) was used. After weighing, the extrudate was transferred in a 15 ml centrifuge tube. 2 ml of acetonitrile containing 0.1% trifluoric acid (TFA) were added to dissolve the polymer. After 1 minute of shaking with an IKR-VIBRO-FIX-shaker 4 ml of methanol were added to solve the minocycline and precipitate the polymer. Afterwards the tube was centrifuged at 1000 rpm for 5 minutes and sterile filtered through a 0.45 µm Teflon filter. HPLC was performed on a Waters 600 E system with an XTerra RP18 5 µm 3.9×150 column (Waters). 20 µl sample volume were injected at a flowrate of 1.0 ml/min. A gradient program was chosen for the mobile phase. Starting with 25 mM $KH_2PO_4$+0.06% $H_3PO_4$ (A), which shifts over 10 minutes to 60% acetonitrile (B). After 5 minutes the mobile phase was gradually changed back to A within 1 minute. The retention time was 9.5 minutes and the drug was detected with a UV/VIS detector at 355 nm. Linear calibration curves ($r^2$>0.999) were obtained in the range of 2-50 µg/ml. A recovery rate of 96% was achieved.

For the stability investigations an Agilent 1200 Series system with a XTerra RP18 5 µm 3.9×150 column (Waters) was utilized. 10 µl sample volume were injected at a flowrate of 1.0 ml/min. For this method was also a gradient program applied. The mobile phase started with a composition of water/methanol (95/5+0.1% TFA) (A) and was shifted over 7 minutes to pure methanol (0.1% TFA) (B). After 3 minutes the mobile phase returned to solvent A within 1 minute. The retention time was 4.8 minutes. For the evaluation and extraction of the chromatograms, the Chem32 software was used.

VI. Release Studies and Stability Investigation

The extrudates were cut into pieces of 4 mm+/−100 µm length. For each polymer type, 5 extrudates (length 4 mm) were weighed and exposed to 1 ml of phosphate buffered saline (PBS) pH 7.0 in a 2 ml glass vial. The vials were incubated in a light protected water bath at 37° C. For 3 weeks every 2 days samples were taken. From day 22 on, the sample taking interval was stretched to 4 days. Sample taking included a complete substitution of buffer. The samples were stored in a fridge at 2-8° C. until their drug content was evaluated by the above explained HPLC-method. The release profile was examined for 42 days. After this time period, the residue of the extrudates were also investigated by this HPLC-method to quantify the remaining minocycline content.

For the stability investigation, 10 mg samples for minocycline and 20 mg for the complex were weighed into 4 ml glass vials. One of each vial was incubated in 4 ml of PBS pH 7.0 and another vial was exposed to 4 ml of an acidic solution at pH 2.3, which was adjusted with hydrochloric acid. Until the 9th day, samples were taken every day, while the removed volume was not replaced. From there on the intervals were stretched to 3 to 4 days.

B. Results

I. Complex Formation

Molar Ratios

Molar ratios of 2:1, 1:1 and 1:2 (Tetracycline derivate:fatty acid salt) have been tested as potential chelate complexes. The combination of minocycline and magnesium stearate yielded for all ratios a yellow solution. Contrary, the pairing of minocycline with calcium stearate resulted in a suspension for the 1:2 ratio. Therefore, this ratio had been excluded from further investigations. Doxycycline was similar to minocycline with regard to the magnesium stearate complexes. Clear solutions emerged with a less intensive yellow coloring. The pairing of doxycycline with calcium stearate revealed slightly cloudy solutions for the ratios of 1:1 and 1:2.

II. Complex Characterization

1. UV/Vis-Spectroscopy

Figure 13:
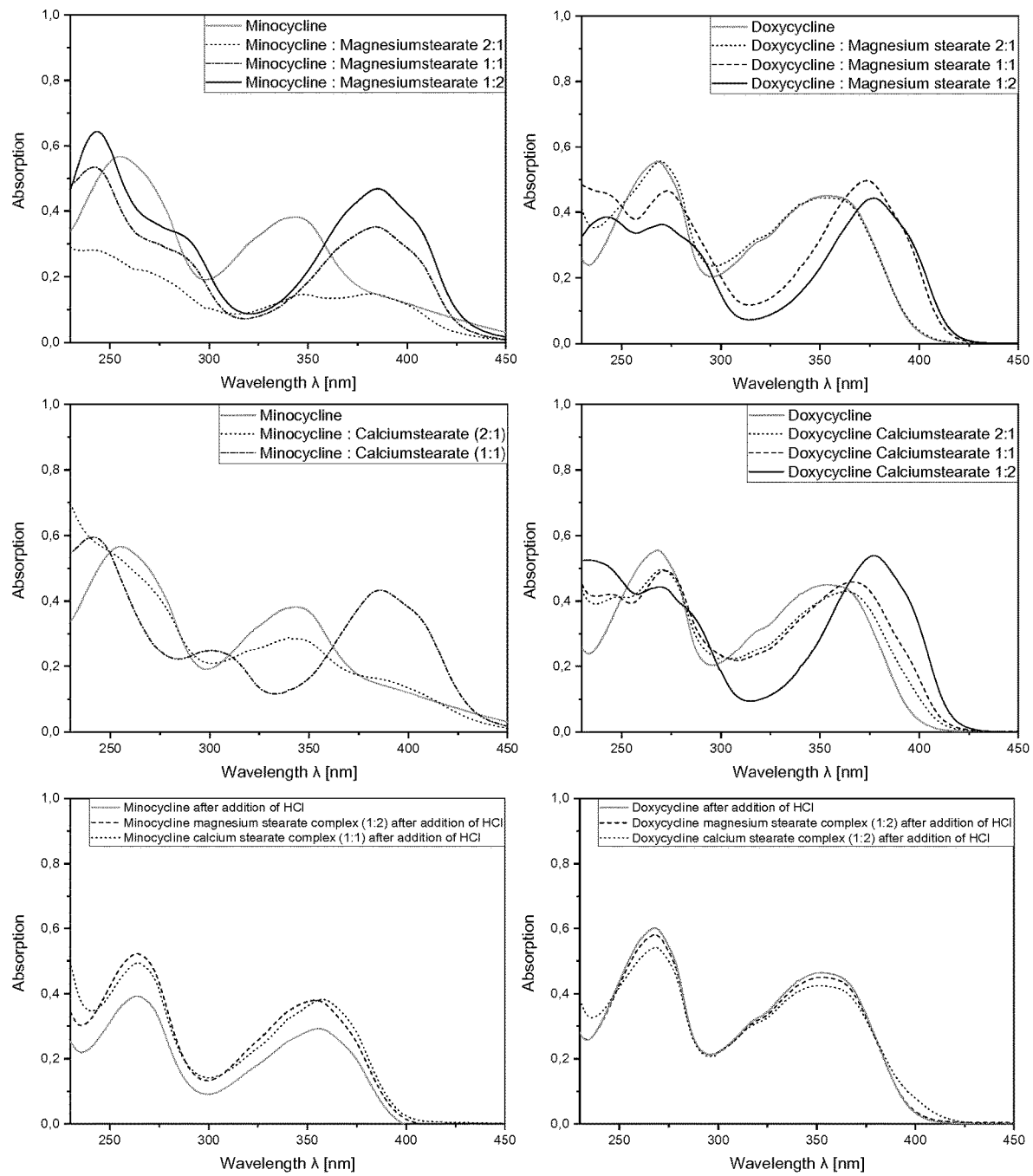
FIG. 13 shows UV/VIS spectra (230-450 nm) of minocycline and doxycycline paired with magnesium- and calcium stearate and their complexes after addition of HCl. The ratios represent the molar ratios.

A prominent indication for a successful chelation are changes in the absorption spectra. Minocycline has an absorption maximum at 255 and 344 nm in ethanol (FIG. 13). After pairing with magnesium stearate, the spectrum changed as a function of magnesium stearate concentration. The spectra of the 1:1 and 1:2 ratios display an almost identical shape and the position of their absorption maxima is similar. The complexation leads for the first maximum to a hypsochromic shift to 244 nm, while the latter one encounters a bathochromic shift to 385 nm. The ratio of 2:1 shows no clear maxima, due to an overlapping spectrum of minocycline and the partially developed complex. In conclusion, the spectra indicate a successful chelation in the molar ratio from 1:1 to 1:2.

In combination with calcium stearate, minocycline's absorption spectrum experiences comparable changes. The 1:1 ratio leads to a hypsochromic shift for the shortwave maximum and bathochromic shift for the longwave maximum, while the 1:2 ratio has already been excluded. Analogous, the 2:1 ratio resembles an overlapping spectrum of pure API and the complex. Both also have in common, that after addition of small amounts of hydrochloric acid (HCl) the absorption maxima of minocycline and the complexes shift to 264 nm and approximately 355 nm (FIG. 13). This indicates a disintegration of the complex, which is useful for the subsequent detection during HPLC analysis.

For doxycycline the results are as expected quite close to minocycline, due to the structural similarity. It is noteworthy however, that both of doxycycline absorption maxima are shifted bathochromically, independent from the chelating ion (FIG. 13). Magnesium stearate shows minor differences for the position of the absorption maxima depending on the amount of fatty acid salt. Interestingly, the spectra of the 2:1 and 1:1 ratios are for calcium stearate almost identical. Therefore, the chelation appears to be incomplete until the ratio of 1:2 is reached. The addition of HCl leads also to a disintegration of the complexes, with spectra and maxima, that are close to those of minocycline.

In conclusion, this experiment lead to the exclusion of all 2:1 ratios, and the 1:1 ratio of doxycycline and calcium stearate, due to the insufficient complex formation.

2. IR-Spectroscopy

Figure 14:
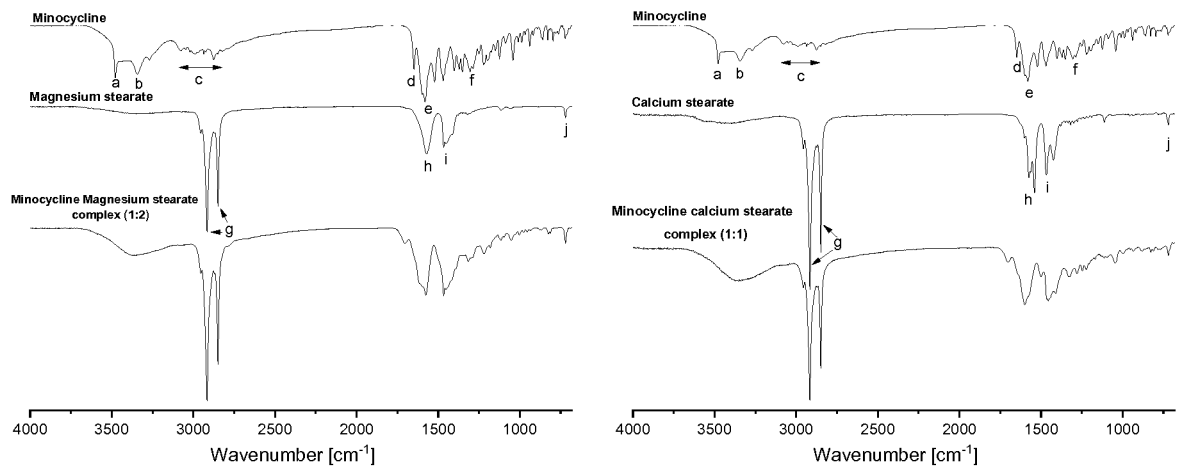
FIG. 14 shows FTIR-ATR-Spectra of minocycline, magnesium and calcium stearate and their complexes; 680-4000 $cm^{-1}$. Minocycline: a—ν O—H; b—ν N—H; c—ν C—H; d—ν $CONH_2$; e—ν C=C (aromatic); f—ν C—N Magnesium stearate/Calcium stearate: g—ν C—H; h—$ν_{as}$ COO; i—δ C—H; j—$CH_2$ rocking-vibration.

The IR-spectra also give evidence for the chelation (FIG. 14). The peaks at 3478 cm$^{-1}$ (a) in the pure minocycline spectrum can be assigned to the hydroxide-vibration taking part in an intramolecular H-bond. The complex grants a broad peak instead. This indicates an impediment to the binding sites free vibration due to the presence of magnesium or calcium ions. Minocycline's C—H vibrations (c) vanquish in the more prominent C—H peaks (g) of magnesium and calcium stearate. The carboxylate peak at 1570 cm$^{-1}$ (h) remains plainly recognizable. At 1700 cm$^{-1}$ appears a new peak, which cannot distinctly be assigned to a specific functional group. The fingerprint area also changed, due to overlapping vibrations, but gives no further evidence.

Figure 15:
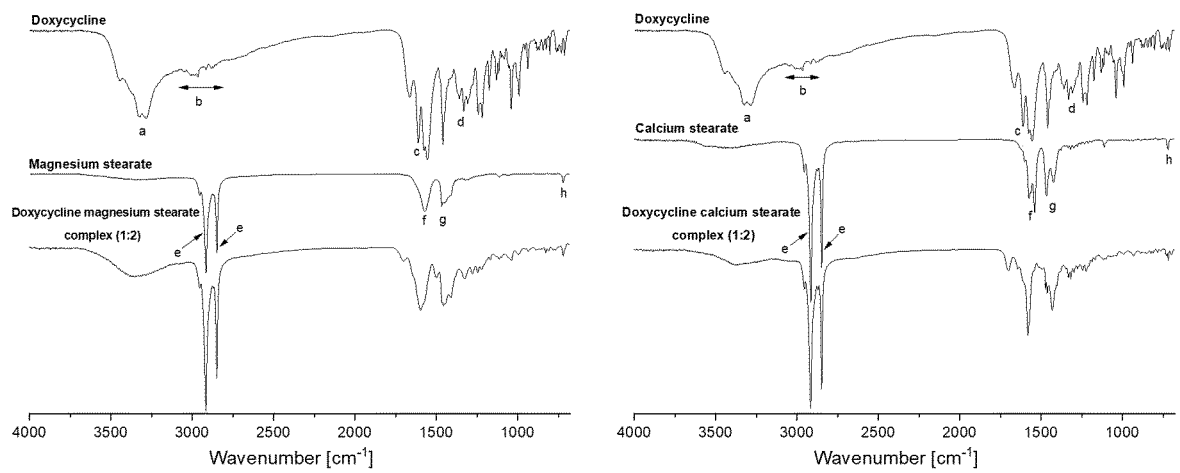
FIG. 15 shows FTIR-ATR-Spectra of doxycycline, magnesium and calcium stearate and their complexes; 680-4000 $cm^{-1}$. Doxycycline: a—ν O—H/ν N—H; b—ν C—H; c—ν $CONH_2$; d—ν C=C (aromatic); f—ν C—N Magnesium stearate/Calcium stearate: e—ν C—H; f—$ν_{as}$ COO; g—δ C—H; h—$CH_2$ rocking-vibration.

For doxycycline however, the IR spectrum exposes a broader peak at approximately 3300 cm$^{-1}$ (a), which cannot be distinguished between O—H and N—H vibration. Nevertheless, this peak is also widened and smoothed in the presence of divalent cations (FIG. 15).

3. Complex Drying and Microscopy

For further processing, it was necessary to transfer the complex into a powder form. Therefore, the complex solutions were slowly dried and their remnants closer examined. The dried minocycline and doxycycline-magnesium stearate complexes both appeared as glasslike, amorphous structures for the molar ratio of 1:2. FIG. 2 illustrates this homogeneous structure as well as the inhomogeneous appearance of the 1:1 ratio for the case of minocycline. The calcium stearate complexes unfortunately did not yield such homogeneous results for either of the antibiotics. Even though the remaining complex ratios might be suitable for other forms of processing, the molar ratio of 1:2 demonstrated more encouraging properties for the intended use.

Changes in solubility were also observed. The minocycline complex exhibited a reduced water solubility compared to the parent drug. In return, the solubility in organic solvents was improved, especially in chloroform. These changes also imply the formation of a chelate complex.

At this point, minocycline was selected for further experiments, even though the doxycycline magnesium stearate complex seemed evenly suitable. The reason therefore was the broader spectrum of activity and the superior capability of tissue penetration (Cunha, B A. et al. *Eur J Clin Microbiol Infect Dis.* 2018, 37(1), 15-20). So, the following paragraphs focus on minocycline magnesium stearate complex in the ratio of 1:2.

III. Disc Diffusion Test

Figure 16:
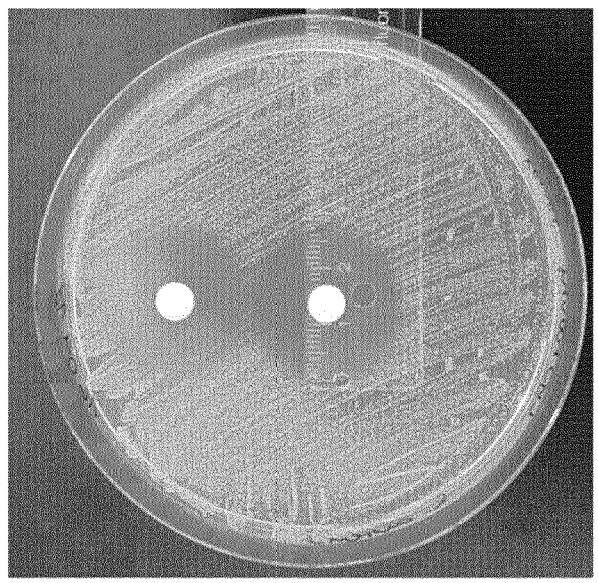
FIG. 16 shows agar plates incubated with *S. aureus* ATCC 29213. Left plate: Discs loaded with ethanol; Middle plate: Discs loaded with ethanolic minocycline complex solution; Right plate: Discs loaded with ethanolic minocycline solution.
Figure 16:
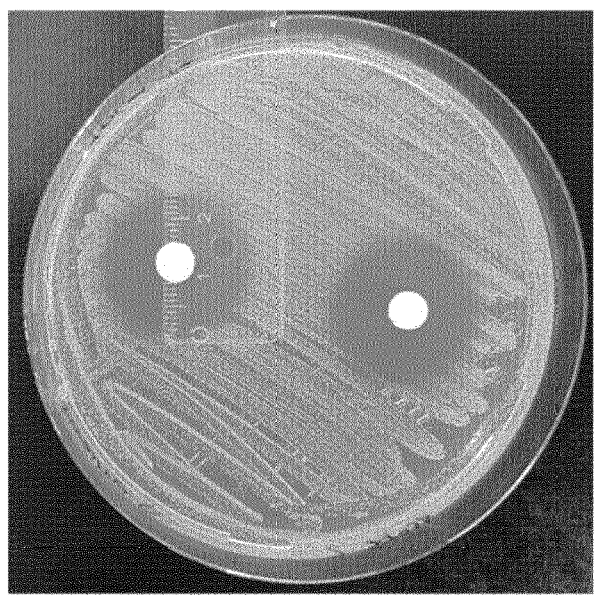
Figure 16:
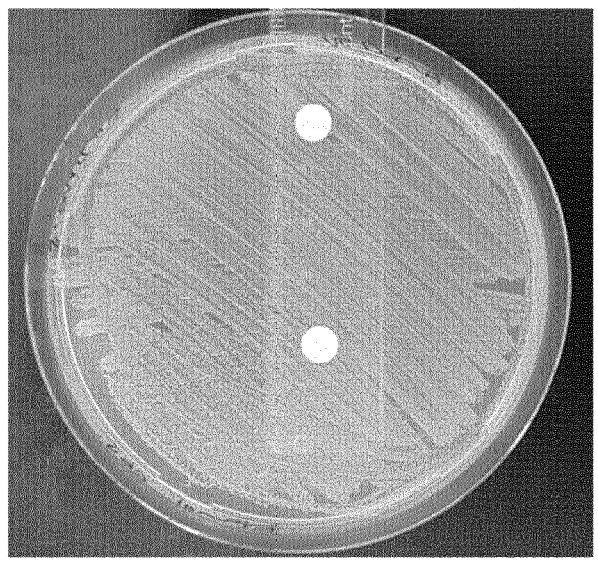

It is well known, that polyvalent cations can have a negative influence on the antibiotic potential of tetracycline antibiotics (Naz, S. et al. *Arzneimittelforschung* 1996, 46(7), 701-704). On account of that fact, a disc diffusion test was carried out, to investigate minocycline's antibiotic activity after complexation. The diameter of the inhibition zone is decisive for the antibiotic activity (FIG. 16: Agar plates incubated with *S. aureus* ATCC 29213. Left plate: Discs loaded with ethanol; Middle plate: Discs loaded with ethanolic minocycline complex solution; Right plate: Discs loaded with ethanolic minocycline solution). The control disks loaded with ethanol were not able to prevent a growth of the test germ. Pure Minocycline accomplished a diameter of 26 mm and the complex achieved 24 mm. Even though the inhibition zone of the complex is slightly smaller, the complex remains active against microbiological threats.

IV. Hot-Melt Extrusion

In advance of the extrusion process, cryomilling ensures a homogeneous extrusion precursor while keeping the thermal stress at a minimum.

With Resomer 502 RG and 503 RG extrudates in a size range from 600 to 800 µm were achieved (FIG. 9). It is noticeable that Resomer 503 possesses viscoelastic properties, resulting in a widening immediately after extrusion. In contrast, Resomer 502 yields a constant, reproducible 600 µm extrudate. The larger diameter results in a differing amount of the available drug, if extrudates of equal length are applied. FIG. 9 illustrates the size differences. Later on, compositions of Resomer 502 and 503 were investigated. These blends did not have an impact on the product diameter. Neither did the addition of GMS alter the extrudate diameter, but it reduced the brittleness.

Nevertheless, these extrudates were still within the desired size range. Additionally, the extrusion of the pure minocycline complex powder was carried out. It was possible to obtain extrudates from this approach, but they were brittle and exhibited fragile mechanic resilience. So, these extrudates only served as reference for the in vitro release experiments.

V. In Vitro Release

Figure 17:
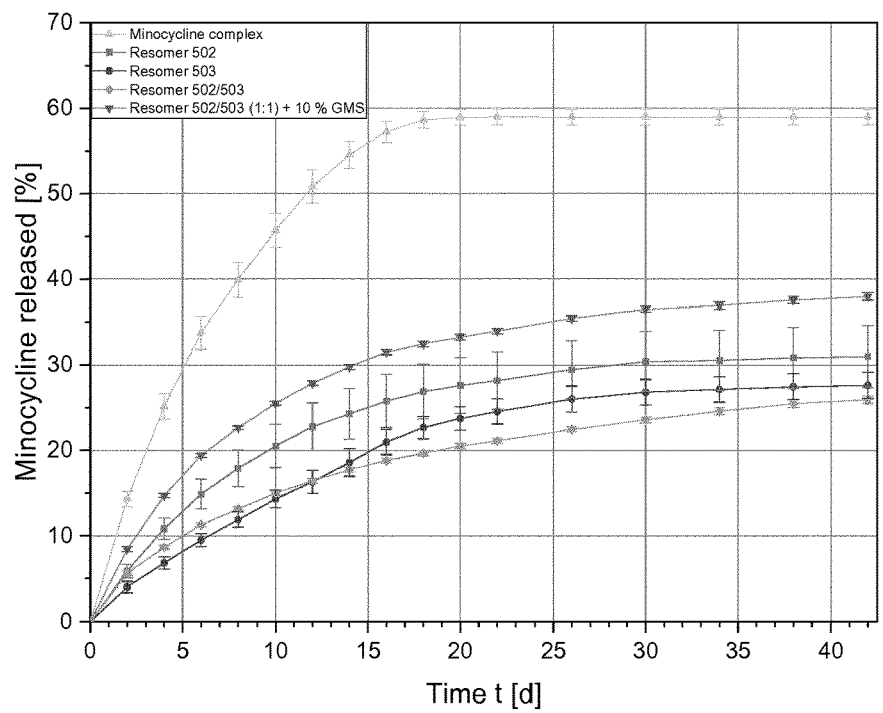
FIG. 17 shows release profile of several minocycline complex PLGA compositions in PBS pH 7.0 at 37° C.

The in vitro release profile (FIG. 17) exhibits for all compositions an initial faster release rate, which progressively slows down. The pure minocycline complex extrudates showed the fastest release, but also no burst.

The addition of a PLGA polymer can modify the release rate to a desired level. As expected, Resomer 502 offers a faster release compared to Resomer 503, due to its lower molecular weight. This difference is especially examinable in the first two weeks, until their release rates start to align. Remarkable is also the higher standard variation for Resomer 502. For the 1:1 composition of Resomer 502 and 503, a release between the curves of the single polymers was expected. These expectations were met until day 7, when the polymer blend fell behind. After 42 days the polymer blend nearly reaches the release level of Resomer 503. So, in contrast the impact of GMS seems even greater. Initially GMS was used as softener for the extrudates, but the effect was relatively small, even though the overall stability was enhanced. The greater benefit lay in the significant increase of the release rate. Within 10 days the doubled amount had been released compared to the batch without GMS. From day 10 on, their release rates also align and no greater difference prevails.

The in vitro release experiments demonstrate the controlled release over 42 days.

VI. Stability Studies

Figure 18:
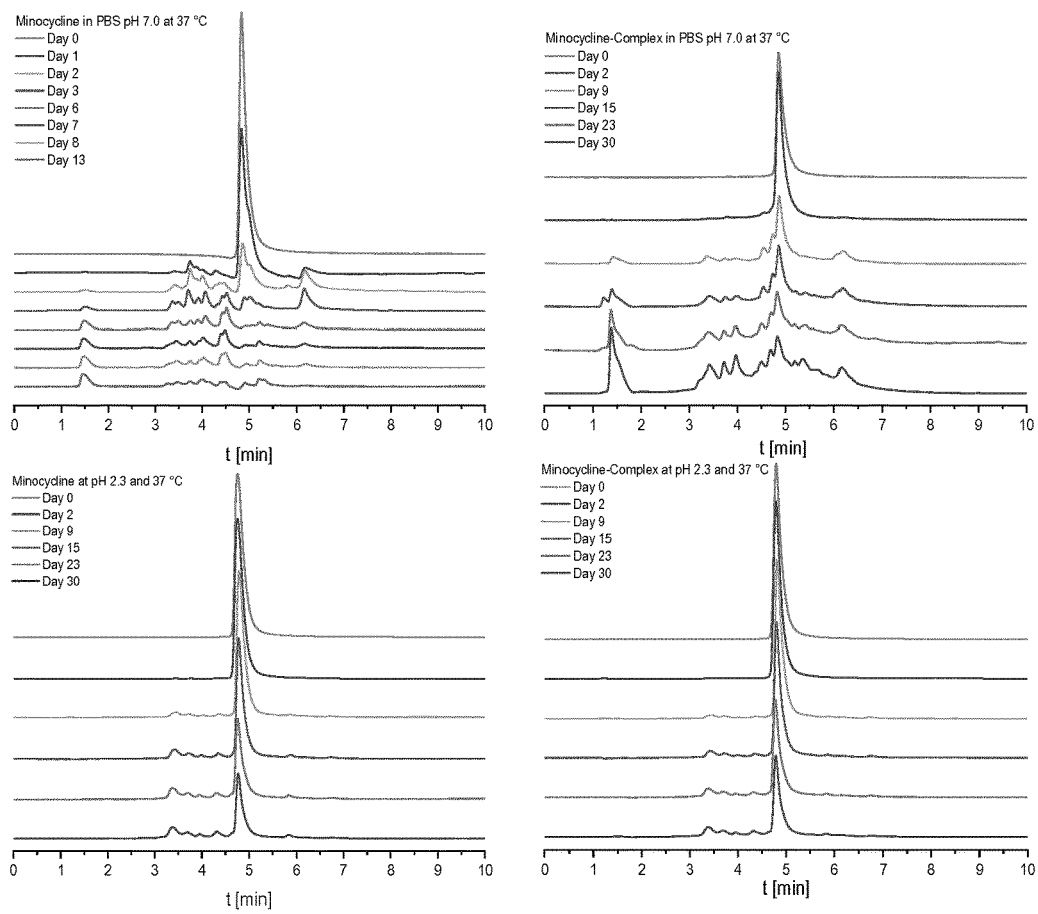
FIG. 18 shows chromatograms of minocycline and the minocycline complex at pH 7.0 and pH 2.3 at 37° C.

This study was carried out to clarify the destiny of the at least 40% of undetected minocycline. FIG. 18 illustrates the ongoing decay of minocycline and the complex depending on the pH of the medium. Minocycline exhibits perceptible degradation at the neutral pH value. Within 3 days the minocycline peak at 4.8 minutes vanishes, while degradation products become noticeable. The vast degradation is also on a macroscopic level unmistakable, due to a color change from yellow to pure black. The complex however, is capable to protect minocycline up to a certain degree. After 3 weeks the minocycline peak is still visible, while of course the peaks of the decomposition products grow progressively. The reduced water solubility causes the minor susceptibility to decay. Nevertheless, as the incubation period progresses, more parts of the complex dissolve and become detectable. This can also be noticed in the chromatogram on day 2, where a rise of the minocycline peak is observable. The onset of a chemical equilibrium between solved minocycline, which is subject of decay, and not yet solved minocycline complex is possible.

The acidic environment ensures a longer lifetime of the API. A more moderate decay is observable for minocycline compared to the neutral pH conditions. The same statement is valid for the complex, while here an additional solving over time is again noticeable. From this point on, minocycline and the complex experience a similar degree of degradation. As previously demonstrated, minocycline is released from the complex at acidic conditions. Therefore, similar chromatograms and degradation rates are observable.

Discussion

Tetracyclines possess a wide range of antimicrobial activity, and have proven as locally antimicrobial agents in periodontal therapy. A problem for all tetracyclines is their limited stability in water. Minocycline degrades faster than doxycline, and is a pronene to epimerization in aqueous media and several organic solvents, especially N-methyl pyrrolidone (NMP). These epimers provide only 5% of the initial antibiotic activity A delay of such processes can be achieved if minocycline has been chelated in advance. Of these complexes, magnesium complexes proved to be more stable than their calcium counterparts, probably due to their higher charge density. Such influence of the charge density was noticeable during the chelation process described herein. Magnesium and calcium are both divalent cations, but due to the smaller atom diameter (Mg: 145 µm, Ca: 194 µm), magnesium with its therefore higher charge density can interact more easily with the chelation site. This explains the formation of turbid solutions in the case of doxycycline and a suspension the ratio of 1:2 for minocycline. Additionally, by choosing magnesium and calcium fatty acid salts as second compound, avoidance of water and the alteration of the APIs physical properties can be achieved.

The UV/Vis- and IR-spectroscopy investigations gave evidence about the complex formation and the suitability for the further processing. The shifts of the absorption maxima depending on the concentration of the cations, and the smoothing and widening of the OH-vibration peaks demonstrate the interactions during the chelation. There, minocycline and doxycycline exhibited equal compatibility for the complexation process. Also, both antibiotics demonstrate anti-inflammatory properties, which are beneficial for the treatment of an inflammatory disease like periodontitis. But as mentioned beforehand, minocycline was chosen for the further development, due to its more lipophilic characteristics and its superior spectrum of activity.

The durability of this activity had to be clarified, due to the might hindering interactions between API and polyvalent cation. Fortunately, the disc diffusion test revealed a high activity. A possible explanation for the slightly reduced diameter can be a decreased diffusion of the minocycline molecules through the agar matrix, due to the interaction with the magnesium stearate molecules, creating a larger and more hydrophobic molecule. Nevertheless, these results enabled the progression to the next step of development—the extrusion.

The production process itself is comparable fast and simple. The preparation of the precursor takes little effort and the absence of toxic solvents lowers the risks during manufacturing, creates a compatible product, and ensures the stability of the API. A limitation of the laboratory scale production is the manual extruder filling, resulting in a discontinuous precursor flow.

The final product as preformed insert exhibits several advantageous properties regarding the intended application. Also, there is no necessity for special equipment for the application—a simple tweezer will be sufficient. The diameter of the extrudates is not fixed, but can be adapted. The use of different diameters—adapted to the pocket size and the simultaneous application of different diameters (e.g. 600 µm surrounded by 300 µm) seems highly promising.

The achieved drug load of 11.5% is close to the reasonable limit due to the complex composition with magnesium stearate. The overall share of the complex in the extrudate is 41.2%, leaving 58.8% for the release controlling polymer. The high magnesium stearate quantity contributes to the slightly flexible traits of the extrudates. Various dosing options are imaginable through the simultaneous placement of several extrudates in one sulcus. Also, the release rate is adjustable through the choice of polymer and additional excipient.

The in vitro release period of 42 days is so far exceptional compared to the commercially available systems. As expected, Resomer 502 with its lower molecular weight exhibited a faster release rate, compared to Resomer 503. Remarkable is the higher standard variation for Resomer 502, which can also be linked to the lower molecular weight and a therefore faster autocatalysis and degradation (Fredenberg, S. et al. *Int J Pharm* 2011, 415, 34-52). However, the blend of both polymers behaved surprisingly unexpected. The sudden drop of its release rate is challenging to bring into context. A possible explanation can be a batch to batch variation, analytical difficulties or polymer-polymer interactions, which either create a micro-environment that promotes decay of the API, or impedes the release of minocycline.

For all samples, one observation is striking: a higher percentage of the API remains undetected. Therefore, the stability experiment was scheduled. The known fragility of minocycline in aqueous media leads to the first assumption of decay over the period of the release experiment. The elevated temperature of 37° C. promotes these processes. To gain greater insight, minocycline and the complex were investigated at pH 7.0 and pH 2.3. The neutral pH resembles the physiological pH, while the acidic pH simulates conditions that can occur inside degrading PLGA polymers. The stability investigations revealed a protective function for the complex at neutral pH values. Nevertheless, a part of the API falls to decay. The residue analysis performed at the end of the releasing experiment revealed 10 to 15% of the API to remain inside the extrudates. Considered together, these results enlighten the destiny of the missing API to a great part.

Summary and Conclusion

The objective of this study was to develop an alternative controlled release device for the local antimicrobial treatment of periodontitis. As an inflammatory and bacterial disease, periodontitis can be treated with a local antibiotic or antiseptic formulation. One class of possible antibiotics in such formulations is the group of tetracyclines. Our aim was to provide a preformed insert that offers enhanced drug stability, easy application and controlled release over several weeks. Therefore, a chelate complex consisting of a tetracycline antibiotic and a fatty acid salt was proposed. In this case, minocycline and doxycycline were paired with magnesium- and calcium stearate in different molar ratios. These chelate complexes stabilize the active pharmaceutical ingredient and enable the incorporation into a PLGA polymer matrix via hot melt extrusion. The chelate complexes were characterized via UV/Vis- and IR-spectroscopy, leading to a favoritism of the minocycline-magnesium complexes. For the reevaluation of the antibiotic activity of the complex, a disc diffusion test was carried out. The complex was mixed with different PLGA-polymers and cryomilled in advance of the extrusion. The hot melt extrusion yielded homogeneous extrudates with a diameter from 600 to 900 μm. They contain 11.5% of minocycline, are adjustable in length and offer an easy handling. In vitro release studies revealed a controlled release of the drug over 42 days.

Our approach to a novel application form for the periodontal patient offers several benefits. Minocycline's stability is enhanced by the proposed complexation before and after application. The manufacturing process is versatile, free of any toxic solvents, offers accessibility for upscaling and provides a solid preformed insert. This preformed insert features an easy application without any special equipment, adjustability, and a 42 days lasting controlled, prolonged release, which has not yet been reached by other formulations. In summary, the extrudates possess promising potential to advance as a valuable therapeutic option, in particular in the field of periodontal therapy.

COMPARATIVE EXAMPLE

Comparative Example 18: Treatment with $Na_2HPO_4$

Published international application WO 2012/128417 A1 describes in Example 1 the formation of an "ion complex" through the mixing of 5 wt % aqueous tetracycline hydrochloride solution with a 5 wt % aqueous solution of $Na_2HPO_4$ in a 1:1 volume ratio. Minocycline-HCl ion complexes were also claimed by WO 2012/128417 A1. Therefore, a similar reaction was carried out to compare the minocycline phosphate with our minocycline chelate complex.

Figure 19:
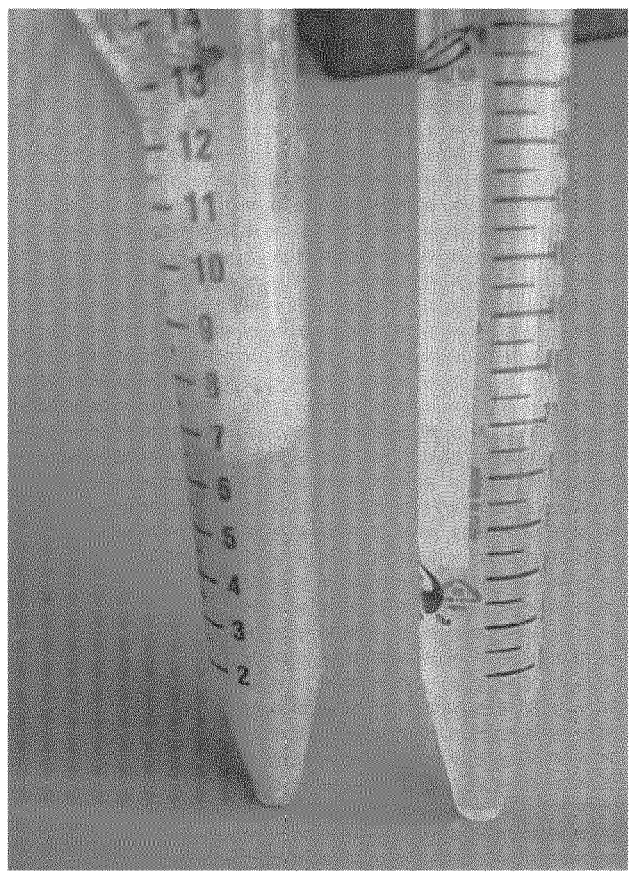
FIG. 19 shows 5 wt % suspension of minocycline HCl (left) and 5 wt % solution of disodium phosphate (right)
Figure 20:
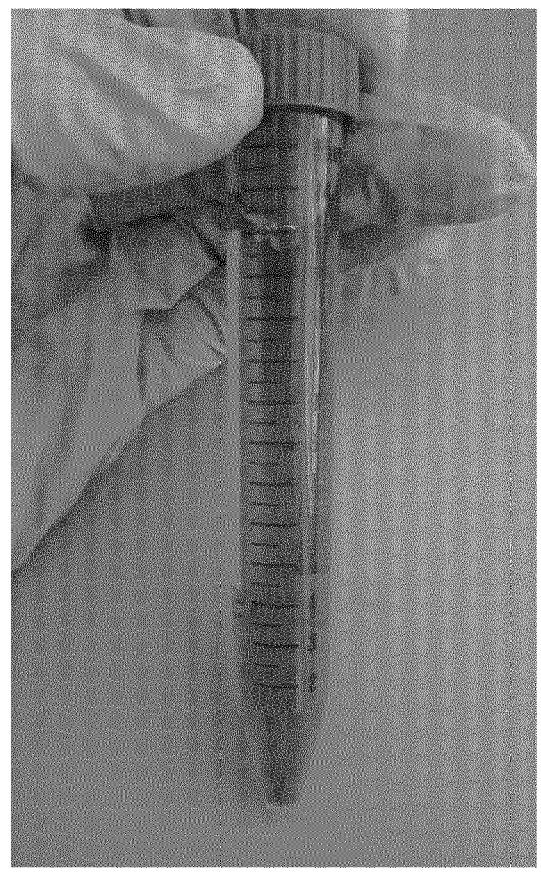
FIG. 20 shows Mixed minocycline HCl and disodium phosphate solution (2.5 wt % t Minocycline HCl, 2.5 wt % disodiumphosphate FIG. 21 shows 1 wt % solution of minocycline HCl (left) and 1 wt % solution of disodium phosphate (right).

In a first attempt 375 mg of minocycline-HCl and $Na_2HPO_4$ were each weighed into a 15 ml falcon tube. Afterwards 7.125 ml of bidistilled water were added to each powder. Minocycline-HCl was not soluble in such a high concentration, resulting in a yellow suspension. $Na_2HPO_4$ was effortless soluble (FIG. 19). These two solutions were mixed, which resulted in an orange solution (FIG. 20). In contrast to WO 2012/128417 A1, no precipitation was observable; the solubility was even enhanced. The solution was centrifuged at 4000 rpm for 4 minutes, but no precipitate was traceable.

Figure 21:
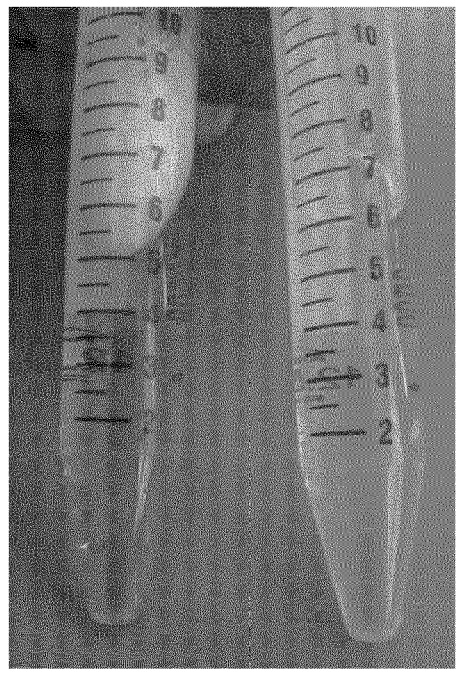
Figure 22:
FIG. 22 shows mixed minocycline HCl and disodium phosphate solution (0.5 wt % t Minocycline HCl, 0.5 wt % disodiumphosphate.
Figure 23:
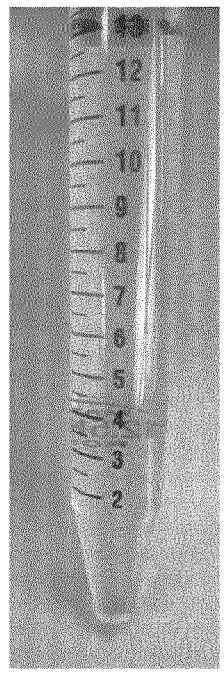
FIG. 23 shows mixed minocycline HCl and disodium phosphate solution (0.5 wt % t Minocycline HCl, 0.5 wt % disodiumphosphate, but with addition of 400 µl 0.1 M HCl

The experiment was repeated with 1 wt % minocycline HCl and 1 wt % $Na_2HPO_4$ solutions. Therefore, 75 mg of each compound were each weighed into 15 ml falcon tubes and 7,425 ml of bidistilled water were added. At this concentration, minocycline-HCl was soluble, and yielded a yellow solution (FIG. 21). The mixing of both components also lead to a yellow solution (FIG. 22). No precipitation was observable and centrifugation at 4000 rpm for 4 minutes did not change the solutions condition. The final solution possessed a pH value of 7.1, which indicates the presence of minocycline as cation. Nevertheless, to ensure minocyclines cationic state before mixing of both solutions, the experiment was also repeated with exchange of 400 μl of the 7.425 ml bidistilled water with 0.1 M HCl. The pH change also did not lead to a precipitation (FIG. 23)

So, for minocycline HCl no successful precipitation of a low-soluble ion complex was observable with disodium phosphate as anionic counterpart.

The present disclosure further includes the following aspects.

[1] A complex comprising a tetracycline compound (TC) or a pharmaceutically acceptable salt, hydrate or solvate thereof and a divalent metal carboxylate ($MA_2$), wherein: the molar ratio TC:$MA_2$ is in the range of 1:0.8-3.0; the divalent metal cation M is an earth alkaline metal cation; and A is a carboxylate anion derived from a $C_8$-$C_{24}$ carboxylic acid. [2] The complex according to aspect [1], wherein the tetracycline compound (TC) is selected from minocycline, doxycycline, tetracycline, chlortetracycline, oxytetracycline, rolitetracycline, tigecycline, demeclocycline, lymecycline, meclocycline, methacycline, omadacycline, sarecycline, eravacycline, clomocycline, 9-(N,N-dimethylglycylamido)-6-demethyl-6-deoxytetracycline and 9-(N,N-dimethylglycylamido)-minocycline. [3] The complex according to any one of the preceding aspects, wherein: the ratio TC:$MA_2$ is 1:2; and/or M is selected from $Mg^{2+}$ and $Ca^{2+}$; and/or A is a carboxylate anion derived from a carboxylic acid selected from arachidic acid ($C_{20}$), stearic acid ($C_{18}$), palmitic acid ($C_{16}$), myristic acid ($C_{14}$), lauric acid ($C_{12}$), capric acid ($C_{10}$), caprylic acid ($C_8$), hydroxystearic acid, oleic acid, linoleic acid, linolenic acid and ricinoleic acid. [4] The complex according to any one of the preceding aspects having the formula [(TC)·2($MgA_2$)], wherein the tetracycline compound (TC) is minocycline or a pharmaceutically acceptable salt, hydrate or solvate thereof. [5] A pharmaceutical preparation comprising the complex according to any one of aspects [1]-[4] and optionally one or more pharmaceutically acceptable excipient(s). [6] The pharmaceutical preparation according to aspect [5], which is arranged for topical administration and/or is selected from the group consisting of extrudate, particle, granule, powder, film, strip, compact, chip, paste, cream, gel, emulsion, suspension, liniment, ointment, balm, lotion, eye drops, spray, topical aerosol, topical solution, topical suspension, skin patch and nonwoven. [7] The pharmaceutical preparation according to aspect [5] or [6] further comprising, as an excipient, one or more biodegradable polymer(s) selected from biodegradable polyesters, such as poly(glycolic acid) (PGA), poly(lactic acid) (PLA), poly(lactic-co-glycolic acid) (PLGA), polyhydroxybutyric acid (PHB) or polycaprolactone (PCL); mixed biodegradable polyesters, such as PLA-PCL and PLGA-PCL; biodegradable PEGylated diblock (AB) or triblock (ABA or BAB) copolymers, such as PEG-PLA, PEG-PLGA, PEG-PCL and PEG-PCL-PLGA; and pectins, and/or wherein the total content of the tetracycline compound (TC) is in the range of 5-20 wt. %. [8] The pharmaceutical preparation according to any one of aspects [5]-[7], which in the form of a strand-shaped extrudate, preferably having an essentially circular or an essentially elliptical cross section and/or a maximum cross-sectional diameter in the range of 0.1-10 mm. [9] A method for manufacturing the complex according to any one of aspects [1]-[4], the method comprising the following steps: (a) mixing a tetracycline compound (TC) or a pharmaceutically acceptable salt, hydrate or solvate thereof and a divalent metal carboxylate ($MA_2$) in a molar ratio of 1:0.8-3.0 with an organic solvent to obtain a dispersion, wherein the divalent metal cation M is an earth alkaline metal cation and A is a carboxylate anion derived from a $C_8$-$C_{24}$ carboxylic acid; (b) heating said dispersion to form the complex; (c) removing the solvent to obtain the complex. [10] A method for manufacturing the pharmaceutical preparation according to aspect [8], the method comprising the following steps: (d) comminuting the complex according to any one of aspects [1]-[4] and, if present, one or more pharmaceutically acceptable excipients to obtain an extrusion precursor; (e) extruding said extrusion precursor at a temperature above room temperature; (f) cooling the product of step (e) to obtain the pharmaceutical preparation in the form of a strand-shaped extrudate. [11] The complex according to any one of aspects [1]-[4] or the pharmaceutical preparation according to any one of aspects [5]-[8] for use in a method for treatment of the human or animal body. [12] The complex according to any one of aspects [1]-[4] or the pharmaceutical preparation according to any one of aspects [5]-[8] for use in a method for therapy and/or prophylaxis of (i) a bacterial infection; or (ii) a bacterial infection caused by one or more bacteria selected from the group consisting of *Porphyromonas gingivalis, Prevotella intermedia, Tannerella forsythia, Streptococcus gordonii, Fusobacterium nucleatum, Actinomyces naeslundii* and *Parvimonas micra*. [13] The complex according to any one of aspects [1]-[4] or the pharmaceutical preparation according to any one of aspects [5]-[8] for the use according to aspect [12], wherein antibiotic activity is maintained over a period of at least 21 days. [14] The complex according to any one of aspects [1]-[4] or the pharmaceutical preparation according to any one of aspects [5]-[8] for use in a method for therapy and/or prophylaxis of an acute, chronic or recurrent periodontal disease. [15] The complex according to any one of aspects [1]-[4] or the pharmaceutical preparation according to any one of aspects [5]-[8] for use in the method according to aspect [14], wherein the periodontal disease is selected from dental plaque-induced gingival diseases, periodontitis, chronic periodontitis, aggressive periodontitis, periodontitis as a manifestation of systemic diseases, necrotizing periodontal diseases, abscesses of the periodontium, periodontitis associated with endodontic lesions, peri-implant mucositis, peri-implantitis and endodontic infections.

The invention claimed is:

1. A complex formed of a tetracycline compound (TC) or a pharmaceutically acceptable salt thereof and a magnesium carboxylate ($MgA_2$), wherein:
   the molar ratio TC:$MgA_2$ is in the range of 1:0.8-3.0; and A is a carboxylate anion derived from stearic acid ($C_{18}$), wherein the tetracycline compound (TC) is selected from minocycline and doxycycline.

2. The complex according to claim 1 having the formula [(TC)·2($MgA_2$)], wherein the tetracycline compound (TC) is minocycline or a pharmaceutically acceptable salt thereof.

3. A pharmaceutical preparation comprising the complex according to claim 1 and one or more pharmaceutically acceptable excipient(s) comprising at least one or more biodegradable polymer(s), wherein the preparation is selected from the group consisting of extrudate, particle, granule, powder, film, strip, compact, chip, paste, cream, gel, emulsion, suspension, liniment, ointment, balm, topical aerosol, topical solution, topical suspension.

4. The pharmaceutical preparation according to claim 3, which is; i) arranged for topical administration; or ii) is an extrudate; or iii) or both.

5. The pharmaceutical preparation according to claim 3, wherein i) the one or more biodegradable polymer(s) is selected from biodegradable polyesters, mixed biodegradable polyesters, biodegradable PEGylated diblock (AB) or triblock (ABA or BAB) copolymers, and pectins; or ii) the total content of the tetracycline compound (TC) is in the range of 5-20 wt. %; or iii) both.

6. The pharmaceutical preparation according to claim 5, wherein the biodegradable polymer(s): i) have a weight average molecular weight range of 4-250 kDa; ii) have a glass transition temperature of 42-48° C.; iii) have an inherent viscosity [dl/g] (0.1% in CHCl3 at 25° C.) of 0.03-1.70; or iv) are PLGA copolymers (poly(D,L-lactide-co-glycolides)) having a L/G ratio of 5/95-95/5; or v) combinations thereof.

7. The pharmaceutical preparation according to claim 5, wherein the biodegradable polymer(s) are PLGA copolymers; i) having a L/G ratio of 25/75-75/25; ii) having a weight average molecular weight range (kDa) of 5-90; iii) having an inherent viscosity [dl/g] (0.1% in CHCl3 at 25° C.) of 0.14-0.82; or iv) being terminated with ester, alkyl ester or PEG groups; v) or combinations thereof.

8. The pharmaceutical preparation according to claim 5, wherein the biodegradable polymer(s) are i) poly(D,L-lactide-co-glycolides) with a PLA/PGA ratio of 50:50, having a weight average molecular weight range of 7,000-38,000 or an inherent viscosity [dl/g] (0.1% in CHCl3 at 25° C.) of 0.16-0.44, or both, or ii) poly(D,L-lactide-co-glycolides) with a PLA/PGA ratio of 50:50 and a PEG end group (PLGA-PEG), having a weight average molecular weight range of 30-85 kDa or an inherent viscosity [dl/g] (0.1% in CHCl3 at 25° C.) of 0.45-0.80, or iii) both.

9. The pharmaceutical preparation according to claim 3, which is in the form of an extrudate.

10. The pharmaceutical preparation according to claim 9, having: i) an essentially circular or an essentially elliptical cross section; or ii) a maximum cross-sectional diameter of 0.1-1 mm; or iii) combinations thereof.

11. A method for manufacturing the complex according to claim 1, the method comprising the following steps:
   (a) providing a mixture comprising:
      a tetracycline compound (TC) selected from minocycline and doxycycline and a magnesium carboxylate ($MgA_2$)

in a molar ratio of 1:0.8-3.0, wherein A is a carboxylate anion derived from stearic acid ($C_{18}$), and an organic solvent, wherein the mixture is substantially free of water;

(b) heating said mixture to form the complex; and (c) removing the organic solvent to obtain the complex.

12. A method for manufacturing the pharmaceutical preparation according to claim 9, the method comprising the following steps, in substantial absence of water:

(d) comminuting the complex according to claim 1 and, if present, one or more pharmaceutically acceptable excipients to obtain an extrusion precursor;

(e) extruding said extrusion precursor at a temperature above room temperature; and (f) cooling the product of step (e) to obtain the pharmaceutical preparation in the form of a strand-shaped extrudate.

13. A method for treatment of a human or animal in need thereof, comprising administering a therapeutically effective amount of the complex according to claim 1, or a pharmaceutical preparation comprising the complex, to the human or animal, wherein the therapy of (i) a bacterial infection comprising one or more bacteria susceptible to minocycline and/or doxycycline; or (ii) a bacterial infection comprising one or more bacteria selected from the group consisting of *Porphyromonas gingivalis, Prevotella intermedia, Tannerella forsythia, Streptococcus gordonii, Fusobacterium nucleatum, Actinomyces naeslundii* and *Parvimonas micra*.

14. The method according to claim 13, wherein antibiotic activity is maintained over a period of at least 21 days.

15. A method for therapy of an acute, chronic or recurrent periodontal disease, the method comprising administering a therapeutically effective amount of the complex according to claim 1, or a pharmaceutical preparation comprising the complex, to a human or animal in need thereof.

16. The method according to claim 15, wherein the periodontal disease is selected from dental plaque-induced gingival diseases, periodontitis, chronic periodontitis, aggressive periodontitis, periodontitis as a manifestation of systemic diseases, necrotizing periodontal diseases, abscesses of the periodontium, periodontitis associated with endodontic lesions, peri-implant mucositis, peri-implantitis and endodontic infections.

17. The pharmaceutical preparation according to claim 5, wherein the biodegradable polyesters are selected from poly(glycolic acid) (PGA), poly(lactic acid) (PLA), poly (lactic-co-glycolic acid) (PLGA), polyhydroxybutyric acid (PHB) and polycaprolactone (PCL); the mixed biodegradable polyesters are selected from PLA-PCL and PLGA-PCL; and the biodegradable PEGylated diblock (AB) or triblock (ABA or BAB) copolymers are selected from PEG-PLA, PEG-PLGA, PEG-PCL and PEG-PCL-PLGA.

18. The method according to claim 15, wherein the complex, or the pharmaceutical preparation comprising the complex, is administered to one or more of a tooth, gum, and periodontal pocket, of the human or animal.

19. A pharmaceutical preparation comprising the complex according to claim 1 and a biodegradable polymer, wherein the preparation is an extrudate.

20. The pharmaceutical preparation according to claim 19, wherein the total content of the tetracycline compound (TC) is in the range of 5-20 wt. %.

21. The pharmaceutical preparation according to claim 19, wherein the biodegradable polymer is selected from biodegradable polyesters, mixed biodegradable polyesters, biodegradable PEGylated diblock (AB) or triblock (ABA or BAB) copolymers, and pectins.

22. The pharmaceutical preparation according to claim 21, wherein the biodegradable polymer is a biodegradable polyester selected from poly(glycolic acid) (PGA), poly (lactic acid) (PLA), poly(lactic-co-glycolic acid) (PLGA), polyhydroxybutyric acid (PHB) and polycaprolactone (PCL); the mixed biodegradable polyesters are selected from PLA-PCL and PLGA-PCL; and the biodegradable PEGylated diblock (AB) or triblock (ABA or BAB) copolymers are selected from PEG-PLA, PEG-PLGA, PEG-PCL and PEG-PCL-PLGA.

* * * * *